United States Patent
Hagen

(10) Patent No.: US 9,441,464 B2
(45) Date of Patent: Sep. 13, 2016

(54) BENDABLE STRAIN RELIEF FLUID FILTER LINER, METHOD AND APPARATUS

(75) Inventor: David L. Hagen, Goshen, IN (US)

(73) Assignee: VAST POWER PORTFOLIO, LLC, Elkhart, IN (US)

( * ) Notice: Subject to any disclaimer, the term of this patent is extended or adjusted under 35 U.S.C. 154(b) by 615 days.

(21) Appl. No.: 13/698,100

(22) PCT Filed: May 16, 2011

(86) PCT No.: PCT/US2011/036706
§ 371 (c)(1),
(2), (4) Date: Nov. 15, 2012

(87) PCT Pub. No.: WO2011/146418
PCT Pub. Date: Nov. 24, 2011

(65) Prior Publication Data
US 2013/0062269 A1 Mar. 14, 2013

Related U.S. Application Data

(60) Provisional application No. 61/345,576, filed on May 17, 2010.

(51) Int. Cl.
*E21B 43/08* (2006.01)
*B01D 29/11* (2006.01)
(Continued)

(52) U.S. Cl.
CPC ............ *E21B 43/086* (2013.01); *B01D 29/111* (2013.01); *B01D 29/48* (2013.01);
(Continued)

(58) Field of Classification Search
CPC ..... B01D 29/111; B01D 29/48; E21B 43/00; E21B 43/12; E21B 43/086; E21B 43/088; E21B 33/03

USPC ............ 210/232; 29/505; 219/71, 121, 605; 166/232, 233, 228, 245, 242; 427/256; 138/140

See application file for complete search history.

(56) References Cited

U.S. PATENT DOCUMENTS

| 65,276 A | 5/1867 | Ricker | 175/19 |
| 1,207,808 A | 12/1916 | Steps | 72/203 |

(Continued)

FOREIGN PATENT DOCUMENTS

EP 0 674 095 B1 9/1995

OTHER PUBLICATIONS

Written Opinion of the International Searching Authority for PCT/US2011/036706, Aug. 31, 2011, pp. 1-11.*

(Continued)

*Primary Examiner* — Katherine Zalasky
*Assistant Examiner* — Benjamin Lebron
(74) *Attorney, Agent, or Firm* — Ostrolenk Faber LLP

(57) ABSTRACT

A method of forming a bendable slotted liner with multiple circumferentially overlapping non-axial keystone slots comprising: transversely profiling a rod to form a profiled rod, having bending members outwardly profiled wider than intermediate and inward widths, interspersed with bases profiled to bondably mate with axially adjacent bases on a neighboring winding; forming the profiled rod into alternating port and starboard bending members and base pairs, by one of, bonding transverse spacers to the rod, transversely corrugating the rod, and forming the rod with one of transverse outdents and indents; winding the profiled rod to the outer diameter; and bonding axially paired bases together; wherein configuring the non-axial slot circumferential length greater than the circumferential base length on adjacent rod windings, forming non-axial keystone slots between bending members providing axial strain relief, with outer slot widths within a prescribed slot range and axial strain relief capacity greater than 0.1%.

33 Claims, 7 Drawing Sheets

Figure 1:
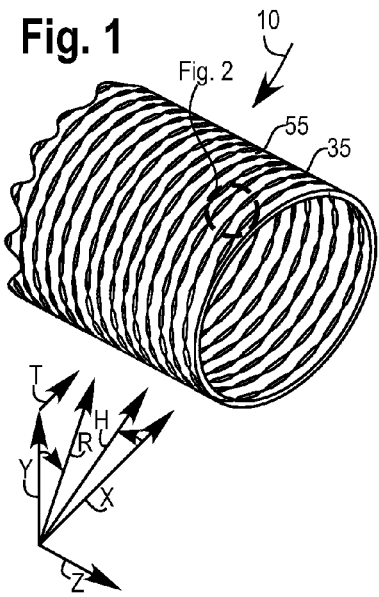

(51) Int. Cl.
*B01D 29/48* (2006.01)
*E21B 43/00* (2006.01)
*E21B 43/12* (2006.01)
*B23K 15/08* (2006.01)
*B01D 39/10* (2006.01)

(52) U.S. Cl.
CPC .............. *B23K 15/08* (2013.01); *E21B 43/00* (2013.01); *E21B 43/08* (2013.01); *E21B 43/082* (2013.01); *E21B 43/12* (2013.01); *B01D 39/10* (2013.01); *B01D 2239/10* (2013.01); *Y10T 29/49908* (2015.01)

(56) References Cited

U.S. PATENT DOCUMENTS

| | | | |
|---|---|---|---|
| 1,339,898 A | 5/1920 | Layne | 166/232 |
| 1,620,412 A | 3/1927 | Tweeddale | 166/203 |
| 1,652,208 A | 12/1927 | McEvoy | 72/324 |
| 2,120,983 A | 6/1938 | Layne | 166/8 |
| 2,160,790 A | 5/1939 | Swanson | 29/163.5 |
| 2,582,340 A * | 1/1952 | Layte | 210/435 |
| 2,682,309 A | 6/1954 | Banchback | 166/231 |
| 3,709,293 A | 1/1973 | Layne et al. | 166/232 |
| 3,750,444 A | 8/1973 | Bittner | 72/78 |
| 3,754,651 A | 8/1973 | Lannoch | 210/106 |
| 3,937,281 A | 2/1976 | Harnsberger | 166/233 |
| 3,973,311 A | 8/1976 | Harnsberger | 29/434 |
| 4,249,292 A | 2/1981 | Calderon | 29/896.61 |
| 4,312,207 A | 1/1982 | Przybyla et al. | 72/100 |
| 4,640,359 A | 2/1987 | Livesey et al. | 166/276 |
| 5,095,990 A | 3/1992 | Best et al. | 166/369 |
| 5,152,892 A | 10/1992 | Chambers | 210/493.4 |
| 5,240,074 A | 8/1993 | Peavy et al. | 166/286 |
| 5,307,984 A | 5/1994 | Nagaoka et al. | 228/189 |
| 5,413,175 A | 5/1995 | Edmunds | 166/252 |
| 5,551,513 A | 9/1996 | Surles et al. | 166/278 |
| 5,642,781 A | 7/1997 | Richard | 166/231 |
| 5,785,122 A | 7/1998 | Spray | 166/227 |
| 5,901,789 A | 5/1999 | Donnelly et al. | 166/381 |
| 5,924,745 A | 7/1999 | Campbell | 285/90 |
| 5,938,925 A | 8/1999 | Hamid et al. | 210/497.1 |
| 5,957,205 A | 9/1999 | Bohme et al. | 166/296 |
| 6,012,522 A | 1/2000 | Donnelly | 166/276 |
| 6,021,905 A | 2/2000 | Frejborg | 209/411 |
| 6,073,659 A | 6/2000 | Lange | 138/177 |
| 6,112,570 A | 9/2000 | Hruschak | 72/370.27 |
| 6,125,932 A | 10/2000 | Hamid et al. | 166/233 |
| 6,315,040 B1 | 11/2001 | Donnelly | 166/207 |
| 6,382,318 B1 | 5/2002 | Whitlock | 166/278 |
| 6,553,038 B1 | 4/2003 | Fukuda | 370/465 |
| 6,571,672 B1 | 6/2003 | Rudd | 83/36 |
| 6,698,595 B2 | 3/2004 | Norell et al. | 210/499 |
| 6,715,544 B2 | 4/2004 | Gillespie et al. | 166/230 |
| 6,722,443 B1 | 4/2004 | Metcalfe | 166/384 |
| 6,761,270 B2 | 7/2004 | Carew | 210/352 |
| 6,799,637 B2 | 10/2004 | Schetky et al. | 166/384 |
| 6,898,957 B2 | 5/2005 | Slack | 72/122 |
| 6,904,974 B2 | 6/2005 | Slack | 166/384 |
| 7,069,657 B2 | 7/2006 | Culp et al. | 29/896.61 |
| 7,073,366 B2 | 7/2006 | Hruschak et al. | 72/320.27 |
| 7,093,653 B2 | 8/2006 | Metcalfe et al. | 166/230 |
| 7,100,686 B2 | 9/2006 | Wittrisch | 166/227 |
| 7,146,835 B2 | 12/2006 | Hruschak et al. | 72/7.1 |
| 7,188,687 B2 | 3/2007 | Rudd et al. | 175/171 |
| 7,281,319 B1 | 10/2007 | Allford | 29/703 |
| 7,380,840 B2 | 6/2008 | Sivley et al. | 285/334 |
| 7,578,343 B2 | 8/2009 | Augustine | 166/227 |
| 7,845,407 B2 | 12/2010 | Bunnell et al. | 166/278 |
| 7,861,788 B2 | 1/2011 | Tips et al. | 166/319 |
| 7,922,637 B2 | 4/2011 | Motokawa et al. | 492/56 |
| 8,056,627 B2 | 11/2011 | Johnson et al. | 166/272.3 |
| 2002/0108478 A1 | 8/2002 | Klimack et al. | 83/54 |
| 2003/0021922 A1 | 1/2003 | Bode | 428/34.4 |
| 2003/0196750 A1* | 10/2003 | Sakai | B01D 29/012 156/272.8 |
| 2004/0131812 A1 | 7/2004 | Metcalfe et al. | 428/36.9 |
| 2004/0253058 A1 | 12/2004 | Eck | 405/184.4 |
| 2005/0028658 A1 | 2/2005 | Klimack et al. | 83/54 |
| 2005/0269084 A1 | 12/2005 | Klimack et al. | 166/255.3 |
| 2007/0044957 A1 | 3/2007 | Watson et al. | 166/245 |
| 2007/0215346 A1 | 9/2007 | Sloan et al. | 166/250.01 |
| 2008/0093079 A1 | 4/2008 | Bryant et al. | 166/313 |
| 2009/0014174 A1 | 1/2009 | Hollies | 166/228 |
| 2010/0126720 A1 | 5/2010 | Kaiser et al. | 166/268 |
| 2010/0243239 A1 | 9/2010 | Furui et al. | 166/233 |
| 2011/0146831 A1 | 6/2011 | Tooker | 138/177 |
| 2012/0199353 A1 | 8/2012 | Fermaniuk et al. | 166/305.1 |

OTHER PUBLICATIONS

V. Mishra, "A Model for Matrix Acidizing of Long Horizontal Well in Carbonate Reservoirs"—*Thesis submitted to Texas A&M University*, (Aug. 2007).
D. Bennion et al., "Protocols for Slotted Liner Design for Optimum SAGD Operation", *Petroleum Society, Canadian International Petroleum Conference*, pp. 1-13 (Jun. 2008).
K. Furui, "A Comprehensive Skin Factor Model for Well Completions Based on Finite Element Simulations", *Dissertation submitted to Texas A&M University*, May 2004.
J. Xie et al., "Slotted liner design for SAGD wells", *World Oil*, pp. 67-75 (Jun. 2007).
G. Woiceshyn et al., "Mechanical Evaluation of a New Sand Control Screen for SAGD", *Canadian Heavy Oil Association, Petroleum Society*, SPE/PS/CHOA 117486, (Oct. 2008).
K. Hamilton et al., "Full-Scale Testing of a New Sand Control Screen for SAGD Applications", *World Heavy Oil Congress*, pp. 1-10 (2009).
Y. Tang, "Optimization of Horizontal Well Completion", *Dissertation submitted to Texas A&M University*, (May 2001).
International Search Report dated Aug. 31, 2011 issued in corresponding international patent application No. PCT/US2011/036706.
J. Xie et al., "Slotted liner design for SAGD wells", *World Oil*, pp. 67-75, Jun. 2007.
Pat Roche, "Daily Oil Bulletin", Jun. 4, 2015.

* cited by examiner

BENDABLE STRAIN RELIEF FLUID FILTER LINER, METHOD AND APPARATUS

CROSS REFERENCE TO RELATED APPLICATIONS

The present application is a 35 U.S.C. §371 National Phase conversion of PCT/US2011/036706, filed May 16, 2011, which claims benefit of U.S. Provisional Application No. 61/345,576, filed May 17, 2010, the disclosure of which is incorporated herein by reference. The PCT International Application was published in the English language.

BACKGROUND OF THE INVENTION

1. Field of the Invention

This invention relates to the configuration of strain relief liners or tubes to provide bending and/or thermal strain relief for recovering or delivering fluid in a resource.

2. Description of Related Art

BACKGROUND

Hydrocarbon resources, such as oil sands and heavy oil resources, are commonly heated to reduce viscosity and enhance recovery, especially in temperate or polar regions. E.g., a conventional axially slotted recovery liner heated from 20° C. to 350° C. experiences a 330° C. increase in temperature, such as in Cyclic Steam Stimulation (CSS) of a heavy oil resource. This heating typically causes a 0.43% thermally induced expansion or strain for common metals having a coefficient of expansion about 0.0013% m/m/K. With 600 m to 1,200 m long (1969'-3937') axially slotted liners, such heating would cause 2.6 m to 5.2 m (8.5'-17') of unconstrained expansion, or equivalent compressive stress when constrained in situ.

Similarly, with Steam Assisted Gravity Drainage (SAGD), axially slotted recovery liners heated from 20° C. to 290° C. experience a 270° C. temperature increase. This typically causes about 0.38% thermally induced expansion or equivalent compressive strain in situ. E.g., 2.3 m to 4.6 m strain for 600 m to 1,200 m long slotted recovery liners without strain relief. Colder locations would experience even higher temperature increases and thermal expansion. E.g., from near freezing temperatures near Ft. McMurray, Alberta, Canada, or colder Arctic regions.

With conventionally slotted liners installed within and constrained by a hydrocarbon resource, such thermal temperature difference causes a corresponding thermally induced compressive stress equivalent to about 0.38% to 0.43% strain. This compressive stress at design is substantially above the typical elastic design compressive stress. (e.g., above an elastic design stress of 0.2% to 0.3% depending on material). Heating constrained slotted liners to such temperature increases commonly results in substantial plastic deformation.

Even higher temperatures are used for in situ heating to crack heavier hydrocarbons into lighter hydrocarbons. E.g. kerogen heated to above 600° C. to break it down. It is sometimes heated to 850° C. or more, causing about 10.8 m expansion per 1000 m of slotted liner. Such heating of constrained liners would cause about 1% compressive stress.

Where such axial compressive stress plus resource compressive ("collapse") stress exceeds a "critical" stress, it can cause buckling and/or collapse of constrained heated slotted liners. Transverse and gravitationally compressive geomechanical loads further compound slotted liner strains and stresses. Thermal liners have failed in SAGD and CSS installations. High thermally induced plastic stress is a probable cause of such failures (though causes are difficult to determine.)

Conventional "slotted liners" commonly use filter slots oriented axially with the liner axis. These appear to maintain slot dimensions and filter properties. However, such axially slotted liners provide no axial thermal strain relief. Large axial thermal compressive distortion causes outward or inward buckling, forcing axial slots to widen or close. Sintered wire mesh disks have been pressed into circular holes in fluid recovery liners to provide filtration while recovering heavy hydrocarbon flows into the recovery liner while excluding most of the sand. However, such disk recovery liners provide little relief for high thermal strain in constrained recovery liners. Mesh disks weaken the liner and can pop out.

Differential movement of the surrounding resource transverse to the liner axis can cause recovery liners to bend, dent and/or collapse. Liner bending stiffness in the face of differential ground motion is another probable cause for failure of liners. Delivering drilling tubes, pipe, or liners through bends or "dog legs" often cause high bending stresses. Tensile and compressive stresses in pipe walls can exceed elastic design limits. This causes substantial plastic deformation, severely reducing pipe life.

Bellows strain relief sections having bellows folds running circumferentially or azimuthally around the tube have been developed to relieve axial strain in thermal recovery liners for heavy hydrocarbon or bitumen recovery. However, such bellows are expensive, do not provide for fluid recovery, and have not been widely adopted.

Cylindrical wedge wire collection screens have been used to recover fluid from low pressure slurries such as coal slurries and vegetable mash. However, wedge wire screens are typically bonded to axially oriented reinforcing bars. As with pipe, these supporting bars experience compressive loads, high thermal strain as experienced in SAGD or CSS thermal hydrocarbon recovery, or high tubular bending stresses. Various expandable tubular thermal liners have been offered with screens. These have similar limitations to axially slotted liners and have not been widely accepted.

Configuring liner couplings for thermal heating is seriously complicated by high plastic thermal strains. High strains can damage coupling seals in risers causing steam bypass leakage and thermal losses resulting in high steam to oil ratios (SOR). Liner or tube axial or bending strain can seriously damage liner couplings, especially when they are axially weaker than the liner tube.

Some oil field tubulars are assembled into strings and wound into large wheels. However, the bending stresses and dimensions involved have limited this to small diameter drilling tube.

SUMMARY OF THE INVENTION

The invention provides methods and apparatus to relieve a portion of high strain in heated or bent thermal liners comprising filters to collect (or inject) fluids which filters constrain a prescribed size fraction of sand, particulates or other debris from traversing the filters. Some embodiments form non-axial strain relief slots by assembling helical or circumferential elongated components or rods into slotted tubulars. Such non-axially aligned slots are configured to form bending members in the slotted relief liner tube interspersed with and supported by base regions. Axially neighboring bases are circumferentially offset sufficiently for the adjacent bending members to relieve axial tubular strain caused by thermal changes and/or bending.

Methods are provided for straightening rods. These are combined with forming the rod transverse profile to give matching surfaces on alternating pairs of adjacent bases sufficient to bond those adjacent bases when the profiled rod is wound into a liner.

Some methods provide for forming a straight rod, corrugating the rod, and forming the rod into geared configurations. These shaped rods may then be wound and bonded together to form relief/filter slots with medium to high torsional strength.

The strain relief slots may be configured as filter elements by configuring the width of the relief slots themselves, or by restricting fluid openings with mesh or porous elements, sufficiently to restrict the size of sand, particulates, or other debris from traversing the filter elements. Strain relief slots may be laser trimmed.

Fluid may be recovered or delivered through these filtering non-axial strain relief slots and/or through other filter elements while withstanding compression in subterranean locations. E.g., the fluid may comprise an aqueous fluid, fluid sulfur, and/or a hydrocarbon comprising one or more of heavy oil, very heavy oil, bitumen from "oil sands", shale oil, pyrolysis oil, synthesis oil, methane, carbon monoxide, and/or hydrogen, or mixtures thereof, such as result from heating, pyrolyzing, cracking, upgrading, and/or gasifying and synthesizing fluid in an underground hydrocarbon resource.

BRIEF DESCRIPTION OF THE DRAWING(S)

These and other features, benefits and advantages of the present disclosure will become apparent from the following description of the disclosure and the appended claims, which refer to the accompanying drawings, wherein like reference numerals refer to like features across the several views, and wherein:

FIG. 1 Perspective of corrugated helically wound strain relief liner.

Figure 2:
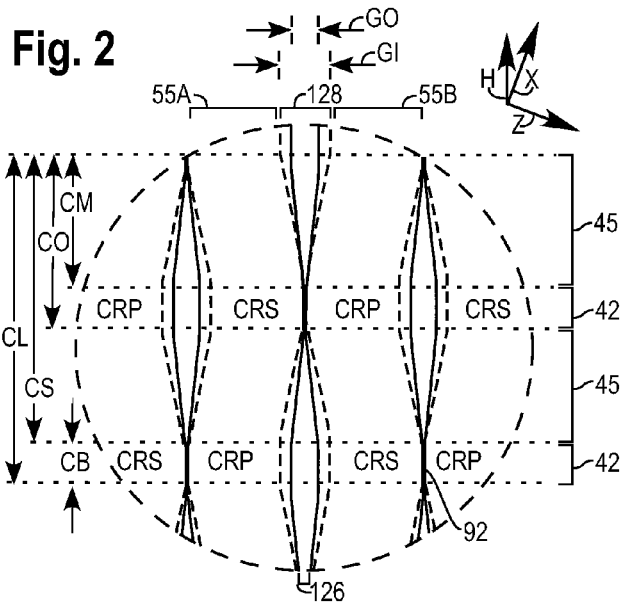

FIG. 2 Plan view detail of offset corrugated windings with filter slot openings.

Figure 3:
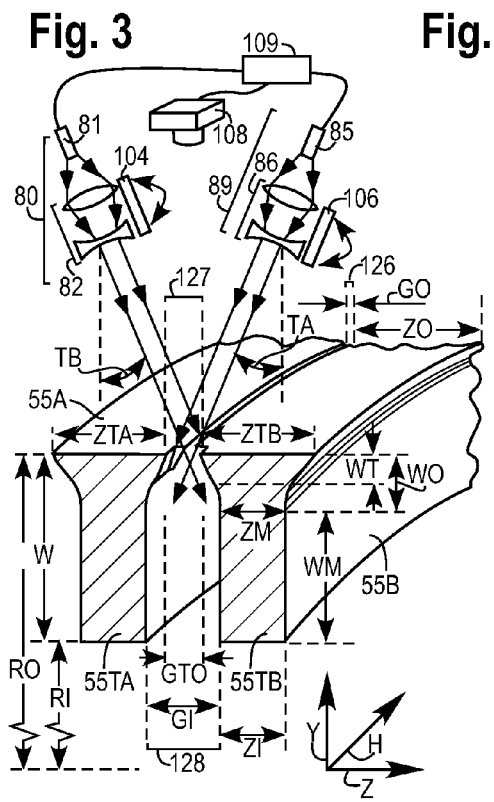

FIG. 3 Laser trimming "keystone" filter slots.

Figure 4:
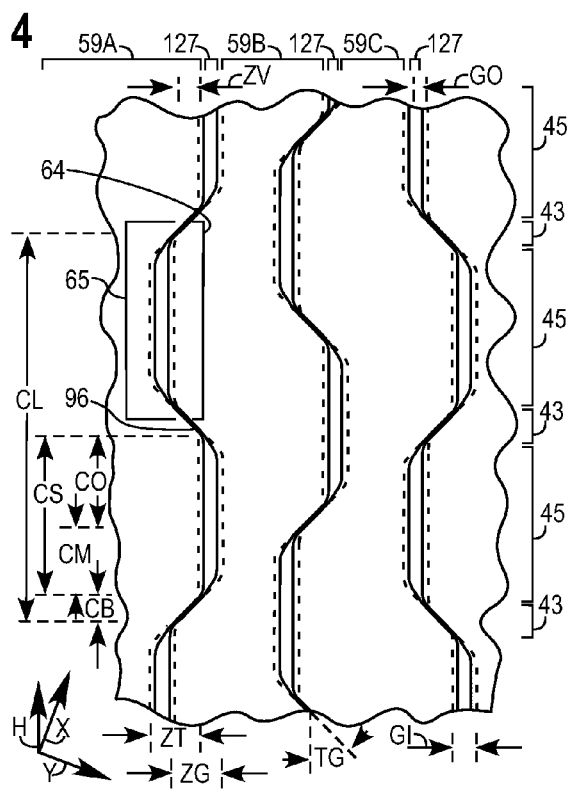

FIG. 4 Plan view detail of "geared" wound liner enhancing torsional strength.

Figure 5:
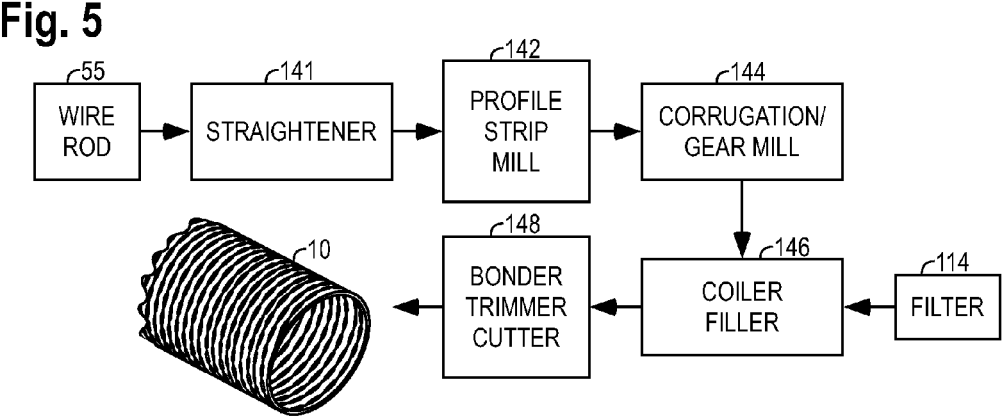

FIG. 5 Schematic helically winding and bonding a corrugated/geared liner.

Figure 6:
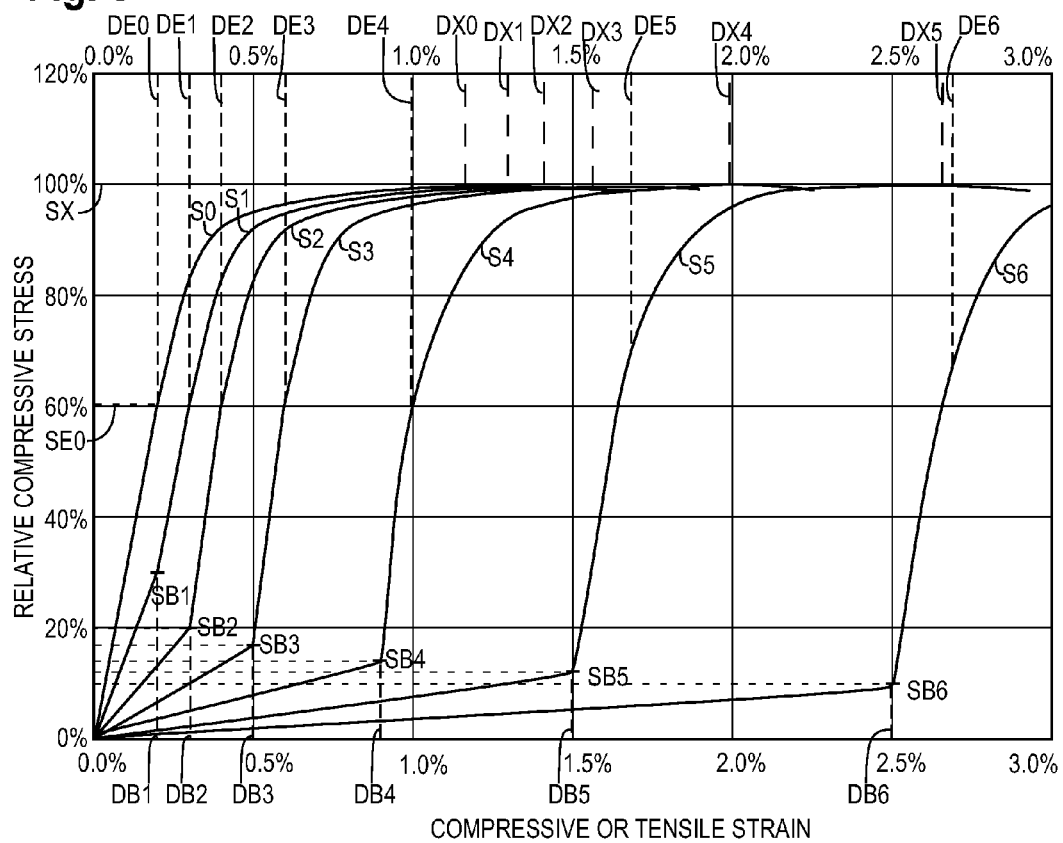

FIG. 6 Schematic stress-strain curves for relief versus non-relief liner configurations.

Figure 7:
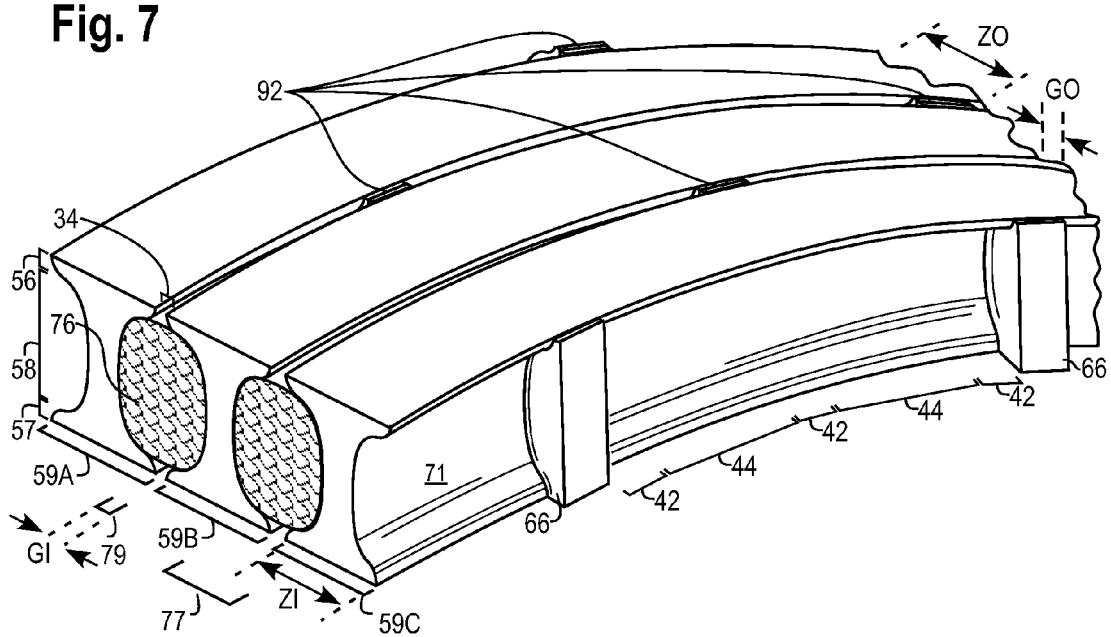

FIG. 7 Formed I beam filter liner with spacers or welds.

Figure 8:
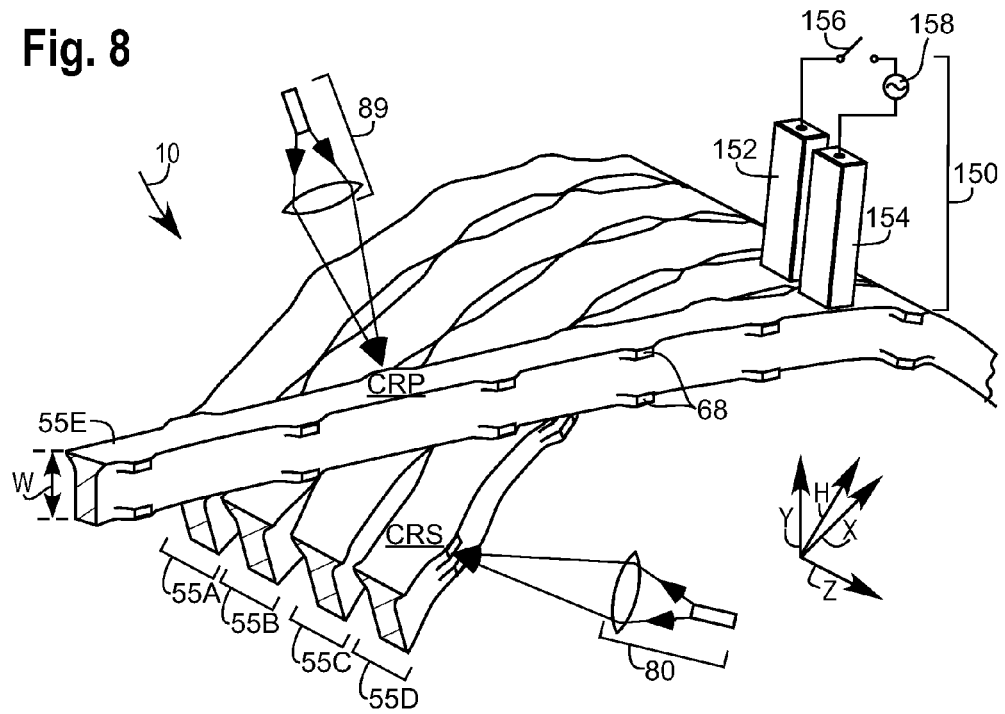

FIG. 8 Schematic of liner winding and bonding method.

Figure 9:
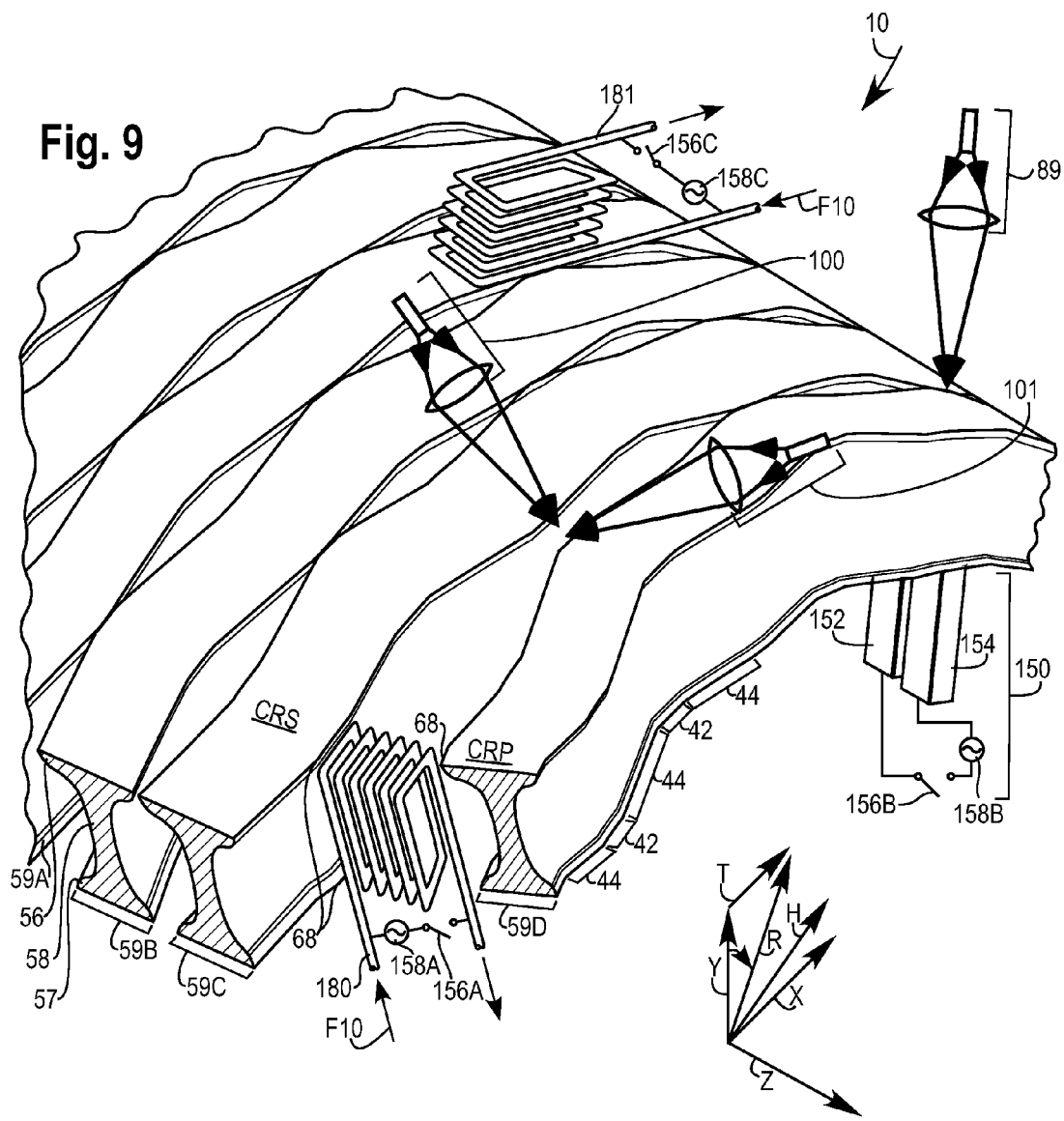

FIG. 9 Perspective of helically winding, hybrid bonding and hardening the liner.

Figure 10:
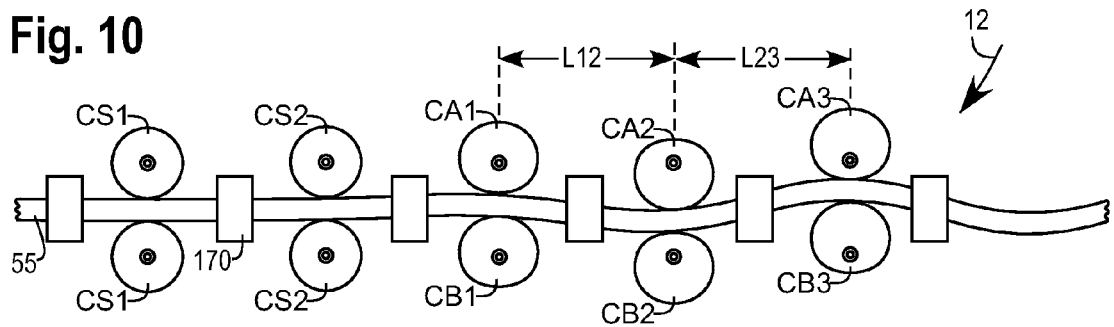

FIG. 10 Plan view schematic of forming corrugated rod.

Figure 11:
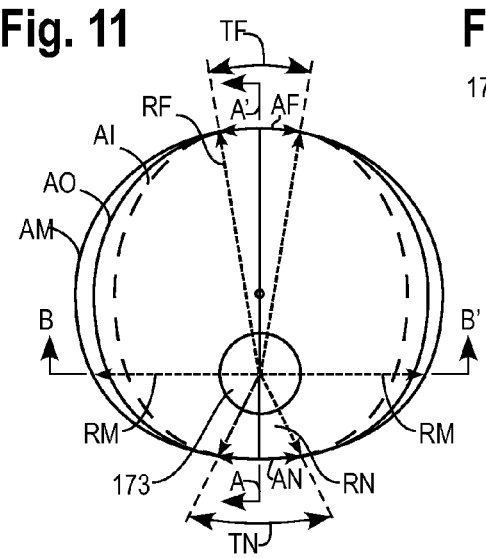

FIG. 11 Plan view detail of corrugating cam to form corrugated rod.

Figure 12:
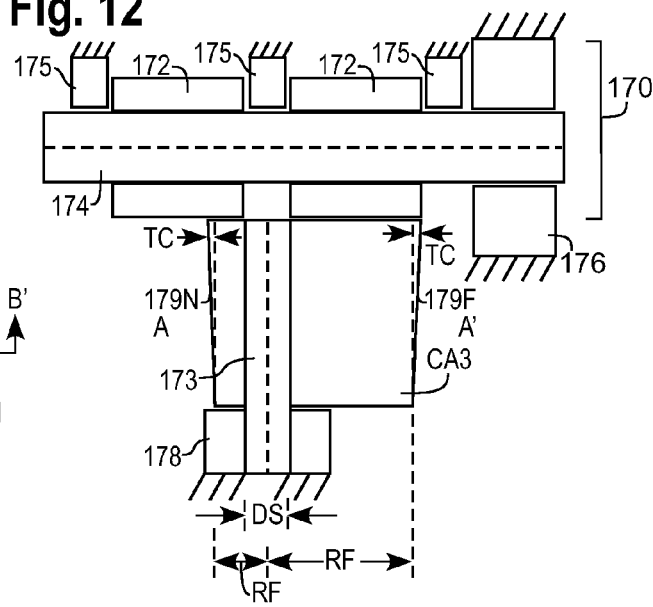

FIG. 12 Elevation view of forming cam in asymmetric transverse cross section.

Figure 13:
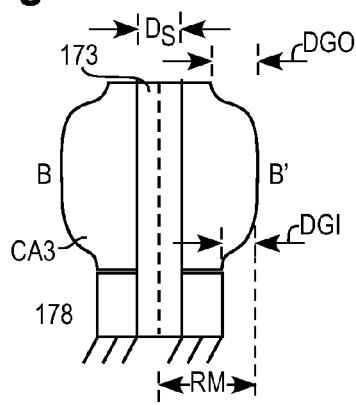

FIG. 13 Elevation view of I-beam forming cam in symmetric transverse cross section.

Figure 14:
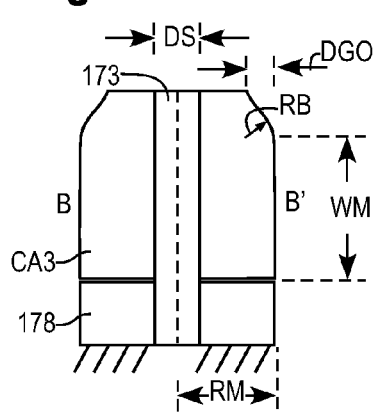

FIG. 14 Elevation view of arch forming cam in symmetric transverse cross section.

Figure 15:
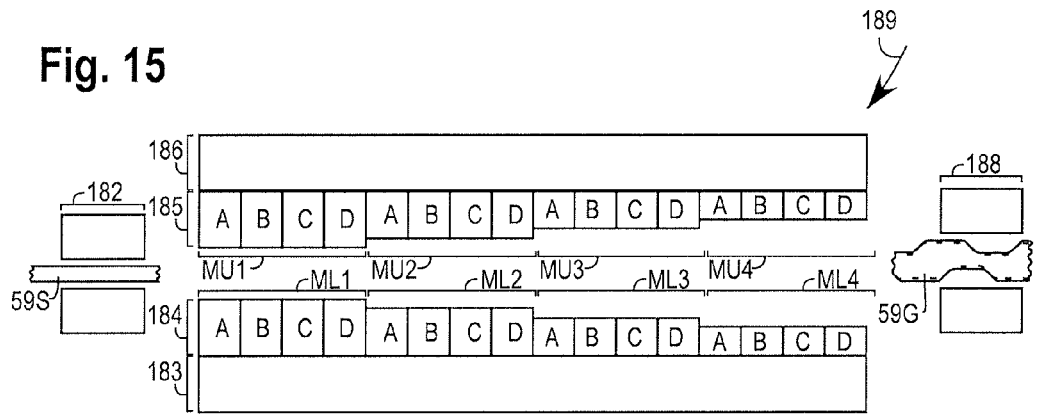

FIG. 15 Schematic elevation view of modular mold for progressive rod stamping.

Figure 16:
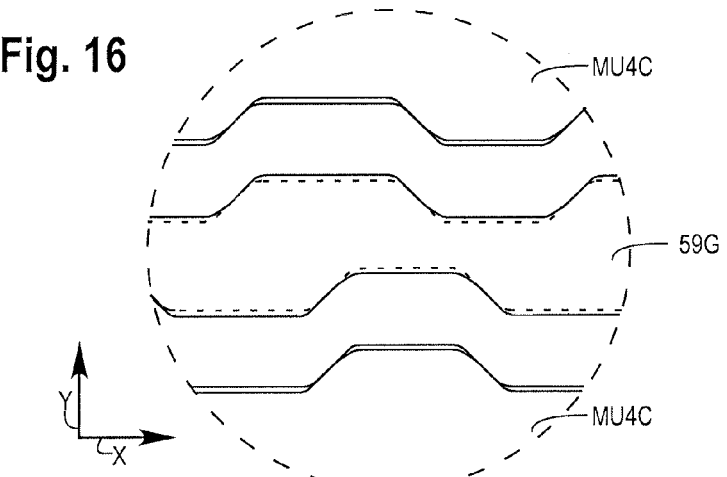

FIG. 16 Detail schematic elevation view of an open rod stamping modular sub mold.

Figure 17:
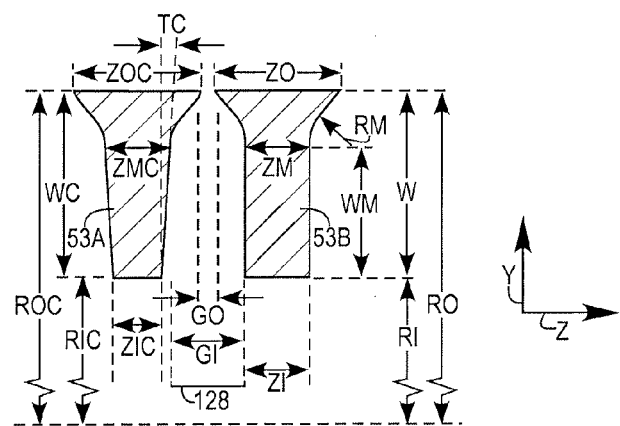

FIG. 17 Schematic elevation of stepped geared configuration.

Figure 18:
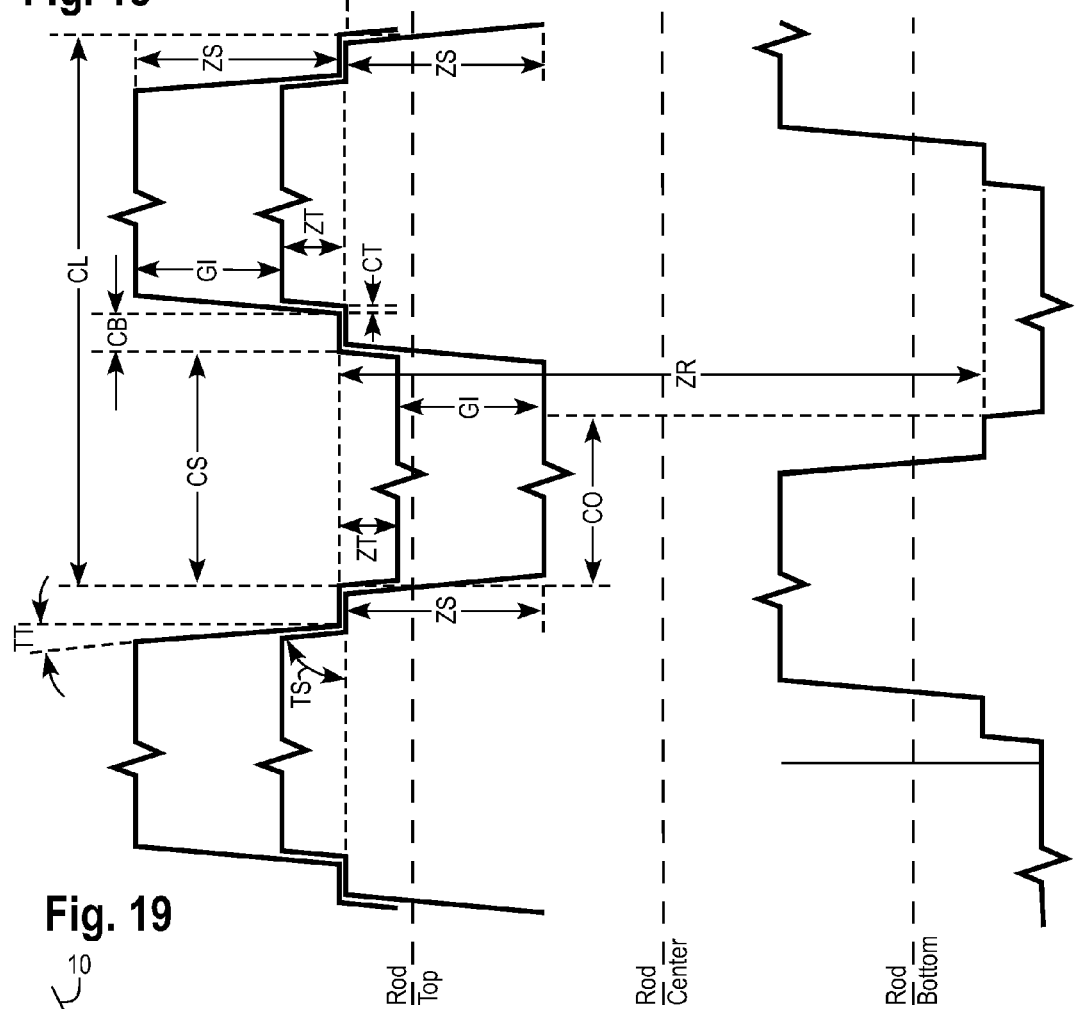

FIG. 18 Schematic elevation cross section of stepped geared rod.

Figure 19:
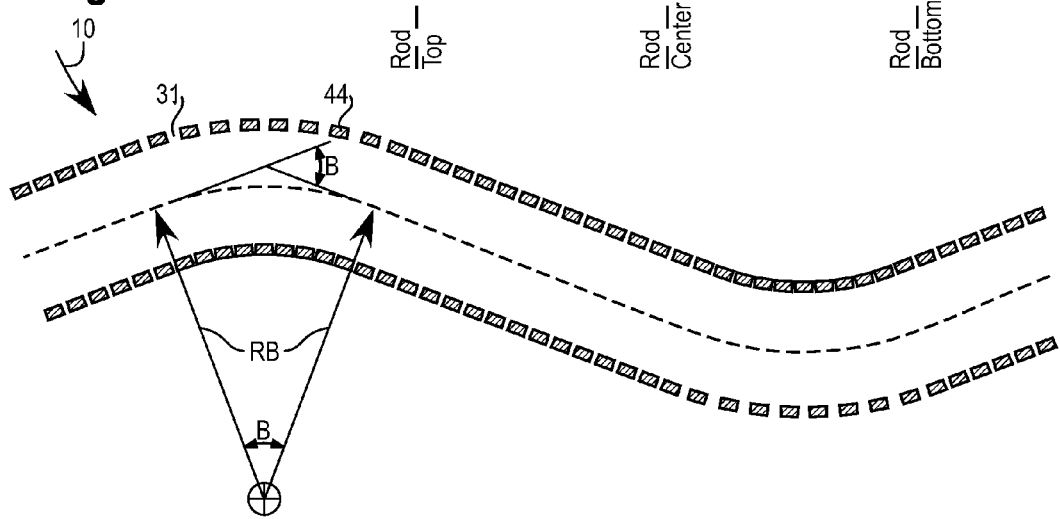

FIG. 19 Schematic of bent liner absorbing expansion & compression

DETAILED DESCRIPTION OF EMBODIMENTS OF THE INVENTION

FIG. 1 shows a relief liner 10 in perspective showing embodiments of the invention. A coordinate system is shown with liner's axis oriented along the Z axis with a radial direction R, a vertical direction Y and tangential or circumferential direction T parallel to the transverse axis X or equivalent radius with radial angle phi. A corrugated or patterned rod 55 is helically wound at a helical angle H to form the liner wall with strain relief filter slots 35 to provide axial strain relief and/or bending strain relief about an axis perpendicular to the Z axis.

A detail of the liner 10 in FIG. 1 is shown in the schematic plan view of FIG. 2 for a corrugated wound configuration along the helical direction H. In some embodiments rod 55 of FIG. 1 may be transversely corrugated into port and starboard bends in rod windings 55A and 55B of FIG. 2. This forms bases 42 between bending members 45. In some configurations, the bases 42 and adjacent bending members 45 (along rod 55) are configured with a slot offset CO (one base plus one bending member) to position port oriented bases CRP on one wrap (55A) opposite starboard oriented bases CRS on the axially adjacent wrap (55B). The slot offset CO with port CRP and starboard CRS corrugations form a slot 126 between the port corrugation on one rod wrap 55A and the starboard corrugation on the adjacent wrap 55B.

In some configurations, the slot offset CO between axially adjacent slots is about half the circumferential repetition length CL of the corrugation pattern. E.g., a port base CRP on wrap 55A may be positioned opposite a starboard base CRS on adjacent wrap 55B. This opposition of separated base members CRP 42 and CRS 42 and correspondingly adjoining bending members 45 forms the slot 126 between the separated base members CRP-CRS and adjoining bending members 45.

Referring further to FIG. 2, this configuration conversely adjusts the winding corrugations in rod wraps or windings 55A and 55B to position a starboard base member CRS 42 on rod wrap 55A adjacent a port base member CRP 42 on the axially (along Z) next wrap 55B to form a CRS-CRP base pair. This base pair CRP-CRS forms an end closing the inner slot 128 and an end to outer slot 126. Bases 42 axially adjacent along axis Z may be joined by welding, soldering, brazing or other bonding method to form a joint 92 joining the base pair CRS-CRP. In this configuration, the slot length CS of slots 126 and 128 is shown as a circumferential base length CB plus two circumferential bending lengths CM. In other configurations, lengths of slots 126 and 128 may differ.

The FIG. 2 configuration forms inner slot 128 and outer slot 126 that are widest in the slot mid section between opposed port and starboard base portions CRP 42 and CRS 42. Referring to FIG. 2 and FIG. 3, in some configurations, the transverse profile of rods 55A and 55B are configured with a radially outer width ZO greater than both of a radially intermediate width ZM and a radially inner width ZI. In such configurations, the rod axial corrugation shown FIG. 2 forms a radially inner slot 128 having inner gap width GI and radially outer slot 126 having outer gap width GO. When placed within a geological resource, outer slot 126 is preferably narrower than inner slot 128, thereby filtering particles from fluid flowing into the liner. This configuration provides an outwardly decreasing "keystone" slot shape with the outer overhang declining proportionally to the inner width GI of slot 128 going from opposed bases CRP-CRS to joined base pairs CRS-CRP. This forms an hexagonal outer slot 126 with maximum width GO between parallel sides equal to the base length CB, with the same length as the hexagonal inner slot 128. The maximum slot width GO may be configured to exclude resource particles ("sand") smaller than a prescribed size.

Referring to FIG. 2, in some configurations, the slot overhang in the widest portion CRP-CRS may be used for the outer slot opening 126, thus shortening the circumferential length (CSO) of the outer slot 126 compared to the circumferential length (CSI) of the inner slot 128, while maintaining the length of the parallel slot sides CB. In other configurations, the slot width GO may be used until the width reaches the width GI of the inner slot 128. This forms an outer hexagonal slot with parallel sides longer than the base length CB of the inner hexagonal slot. This provides an extended hexagonal slot providing the maximum area given a maximum prescribed slot width GO. Further configurations could use intermediate configurations.

For embodiments delivering fluid outward where particulates are kept within the liner, the opposite transverse profile may be used, with radially inner width ZI greater than both of the radially intermediate width ZM and radially outer width ZO, preferably forming an inner slot 128 narrower than the outer slot 126, as the vertical inverse along the Y axis of that shown to FIG. 3.

Referring to FIG. 3 showing a radial YZ cross-section, the winding rod 55 of FIG. 1 may be formed using an arch shaped rod with radial rod depth W from an inner radius RI to an outer radius RO. Rod windings 55A and 55B may be formed into an arch shaped cross section with a radially outer width ZO greater then an intermediate width ZM at height WM from the radially inner side, and also greater than the radially inner width ZI at inner side at the inner radius RI. The rod corrugations and relative rod cross section may be configured to form an arched slot 128 with inner slot width GI and forming an outer slot 126 with outer slot width GO. This beneficially forms the outer depth WO into an outer keystone shape. As shown in plan view FIG. 2, the arched rods form arched slots with the outer slot 126 having width GO and inner slot 128 having width GI between opposed port corrugation CRP and starboard corrugation CRS in base portions 42 of corrugated rods 55A and 55B.

Referring to FIG. 3, some configurations may wind a liner from shaped or arched rods to form windings 55A and 55B having a radially inner axial width ZI and radially outer axial width ZO, and rod depth or liner wall thickness W. By configuring the axial rod to rod spacing, such shaped or arched rods 55A and 55B form gaps or slots 128 with a radially inner slot width GI and radially outer slot width GO.

Trimming slot width: Referring to FIG. 3, in some configurations one or more laser systems 80 and 89 may be used to trim the outer width ZO of one or more profiled rods 55B and 55A to form trimmed rods 55TB and 55TA with respective outer trimmed widths ZTB and ZTA. This trimming may be used to increase the outer slot width from GO of slot 126 to form a trimmed outer slot 127 with trimmed outer gap width GTO. E.g., such laser trimming may use a laser controller to control a first laser system 80 to trim at a first trimming angle TB to achieve part or all of trimming to trimmed outer gap width GTO of outer slot 127. In some configurations, the laser trimming may further control a second laser system 89 to trim rod 55A at a second trimming angle TA to provide a prescribed outer gap width GTO of slot 127 within a prescribed slot width size range.

In some configurations this laser trimming may be conducted with one or both of angles TA and TB between about 0.1 degrees and 45 degrees from the vertical (or radial) direction Y. In other configurations, this laser trimming may use angles TA and TB between about 0.7 degrees and 15 degrees. Further configurations may trim using one or both of angles TA and TB between about 2 degrees and 7 degrees. In some configurations, these lasers trim profiled rods 55B and 55A to trimmed rods 55TB and 55TA with the trimmed outer gap width GTO at a depth WT from the outer rod surface of between 1% and 50% of the rod depth W, and less than a prescribed trim depth range WO above the radially inner rod depth WM. In other configurations, the lasers may trim the profiled rods to a width GTO at depth WT of between about 3% and 15% of rod depth W. This method of laser trimming provides a "trimmed keystone" shape with outer trimmed slot width GTO narrower than both the inner trimmed slot width GTO and the inner slot width GI at the inner rod surface. This reduces potential for buildup of sand within the slot 128. Some configurations may use asymmetric angles TB and TA within these ranges.

In some embodiments, an imager 108 may be used to image the edges of rods 55A and 55B forming outer slot 126 with outer slot width GO. Controller 109 may use the images from imager 108 to evaluate the relative location of slot 126 and/or of trimmed slot 127. E.g., by monitoring the relative location of one or both edges or of the midpoint of slot 126. Imager 108 may similarly monitor the edges or mean location of trimmed slot 127.

Controller 109 may use the location of slot 126 to control the beam from the first laser 81 using the first laser director 104 and first laser focuser 82 to direct laser 81 at the angle TA and focus laser beam 81 on the edge of rod 55B to trim its outer width from outer width ZO to trimmed outer width ZTB. Controller 109 may use the images from imager 108 to control laser beam from the second laser system 89 using the second laser director 106 and second laser focuser 86 to direct laser 85 at the angle TB and focus laser 85 on the edge of rod 55A to trim its width from outer width ZO to trimmed outer width ZTA. Controller 109 may be used to control lasers 81 and 85 together to configure the gap trimmed outer width GTO between rods 55TA and 55TB.

This slot trimming method enables manufacture of thermal liners with one or a few common slot sizes. Then thermal liners may be rapidly trimmed to prescribed slot widths for particular location requirements. This laser trimming need only trim a small portion of the rod depth near the upper outer tip of the arched rod windings 55A and/or 55B, rather than having to cut the full rod depth W. E.g., some configurations may laser may trim less than 25% or less than 15% of the height W.

Further referring to FIG. 2 and FIG. 3, in some embodiments the laser trimming may trim the outer rod width ZTB and ZTA of slots 55B and 55A in portion to width GO to form trimmed slot width GTO to form trimmed slot 127 with a similar shape to slot 126. In other configurations, the width GTO may be extended from the width near the base areas 42 into the adjacent bending members 45 until a minimum slot overhang is reached. The trimming may then maintain this minimum overhang to the end of the trimmed slot 127.

Referring to FIG. 7, some configurations may form a rod into an I-beam shaped profile. E.g., when rod is wrapped or coiled, it then forms profiled rods 59A, 59B, and 59C, having an outer flange 56 and an inner flange 57 separated by a web 58. In some configurations, spacers 66 may be positioned between adjacent rods 59A and 59B to control the rod to rod outer gap GO of outer slot 34, and the inner gap GI of slot 79. In such configurations, spacers 66 are positioned along the rod so that pairs of spacers match on rods 59A and 59B when wound, and are offset from pairs of spacers on the neighboring rod windings. E.g. on rod 59C. Spacers 66 may be bonded to rod windings 59A, 59B and 59C. Alternatively, spacers 66 may be formed with the rod before winding to 59A etc.

In some configurations, spacers 66 may be formed on each of adjacent rods 59A and 59B. The ratio of the axial Z width of a first spacer to the width of the second spacer may be in the range of 0.5 to 2. In some configurations, spacers 66 on port and starboard sides of rod windings 59A and 59B may be matched so that each provides half the total gap width GO.

The spacers 66 may be bonded together by welding, brazing or soldering to form bonds 92 between adjacent rods 59A and 59B, and between rods 59B and 59C, thus forming bases 42 along adjacent rods. Bonded pairs of spacers 66 forming the bases 42 in rod windings 59A, 59B and 59C may be offset with corresponding spacers 66 between neighboring rod windings. Such offsets form bending members 44 between alternating pairs of bases 42 and bonded spacers 66. In some configurations, the windings 59A and 59B may be positioned to provide outer slot gaps GO in the range of 0.1 mm (0.004") to 1.0 mm (0.040").

Controlling gap width: In some configurations, spacers 66 may be formed by additive welding while holding windings 59B and 59C apart at a prescribed spacing to obtain a gap GO. E.g. using Gas Metal Arc Welding (GMAW), Metal Inert Gas (MIG) welding, or Metal Active Gas (MAG) welding. Suitably narrow wire feed may be used.

Referring further to FIG. 7, the outer flange 56 may have the flange 56 shaped to provide a filter slot 34 with outer slot width GO. The inner flange 57 may be configured with a narrower inner axial width (ZI) than the outer axial width (ZO) of the outer flange 58 such that the inner gap GI of slot 77 is greater than the outer gap GO width of outer slot 34.

The overall keystone shape with larger inner gap reduce the blockage by particles within the rod gap. The adjacent I-beam shaped rods 59 may have recesses 71 which together form a filter cavity 77 which may be filled with filter material 76. These cavities give an intermediate gap of axial width (GC) which is less than both the outer gap GO and inner gap GI. This forms a keystone shape between the outer flanges 56 of rods 59A and 59B. In some configurations, the outer flanges 56 may be angled inward to form a keystone shaped gap 34 between them.

TABLE 1

Stress-Strain Design for Some Configurations

| Configuration | SB Stress at Gap Closure | DB Strain at Gap Closure | DE Elastic Design Strain | Growth*/ Gap | DX Collapse Strain % |
|---|---|---|---|---|---|
| S0 | NA | NA | 0.2% | NA | 1.2% |
| S1 | 30% | 0.2% | 0.3% | 300% | 1.3% |
| S2 | 20% | 0.3% | 0.5% | 100% | 1.4% |
| S3 | 17% | 0.5% | 0.7% | 60% | 1.6% |
| S4 | 14% | 0.9% | 1.1% | 33% | 2% |
| S5 | 11% | 1.5% | 1.7% | 20% | |
| S6 | 10% | 2.5% | 2.7% | 12% | |
| S7 | 9% | 5% | 5.5% | 6% | |
| S8 | 8% | 10% | 11% | 3% | |
| S9 | 7% | 20% | 22% | 1.5% | |
| S10 | 6% | 40% | 44% | 0.8% | |
| S11 | 5% | 60% | 66% | 0.5% | |
| S12 | 4% | 80% | 88% | 0.4% | |

Growth = elastic thermal expansion at design temperature increase.

FIG. 6 and Table 1 show further configurations where bending members and slots may be configured to provide various degrees of strain relief compared to the stress strain curve of a conventional slotted liner configuration S0. E.g., configuration S0 with 0.2% strain relief; S2 with 0.3%; S3 with 0.5%, S4 with 0.9%, S5 with 1.5%, and S6 with 2.5% strain relief at gap closure with their respective design bending DB1, DB2, DB3, DB4, DB5 and DB6. The corresponding stresses at design bending are shown as SB1, SB2, SB3, SB4, SB5 and SB6. The corresponding elastic deformations at the design elastic stress SE0 for configurations S1 through S6 are marked as DE1, DE2, DE3, DE4, DE5 and DE6 for configurations S1 through S6 compared to DE0 for the conventional liner S0. At the critical Stress SX, the respective critical deformations for configurations S0 through S5 are shown as DX0, DX1, DX2, DX3, DX4, and DX5. Table 1 shows further examples of bending strain relief configurations. E.g., configuration S7 at 5% design bending strain relief DB, S8 at 10%; S9 at 20%, S10 at 40%; S11 at 60%; and S12 at 80% design bending strain relief.

In other configurations, the bending members may be configured to provide 0.20% strain relief. This may provide a gross strain relief fraction (FR) of 50% of a total strain of 0.4%. Similarly, it may provide 40% strain relief of a total strain of 0.5%. This 0.2% elastic strain relief would provide 100% of the strain above the 0.2% elastic design level in configurations having 0.4% total strain. In liners having 0.5% total thermal strain, this elastic strain relief would similarly provide 67% of the 0.3% strain above the design strain of 0.2%.

In further configurations, the bending members may be configured to accommodate thermal strain of 0.15%. E.g., this may provide a strain relief fraction (FR) of 38% of a total thermal strain of 0.4%. With an elastic design strain of 0.2%, such a strain relief configuration would accommodate up to 0.35% strain or 75% of the thermal strain in excess of the elastic design level.

In some configurations, the sum of the axial widths of non-axial slots plus thermal axial compression along a line in the wall parallel to the axis may be greater than the unconstrained design thermal expansion of the non-slot wall length along that line over a prescribed operating temperature difference.

In one configuration S1, the bending relief strain for design thermal expansion may be configured to provide bending closure DB1 at a design elastic stress SB1. E.g., SB1 of about 50% of the design elastic stress SE0 providing elastic strain relief greater than 0.1%. E.g., Table 1 and FIG. 6 show configuration S1 comprising bending strain relief sufficient to provide a bending strain at closure of the strain relief slots DB1 of 0.1%, at a compressive stress SB1 of 30% compared to SE0 of 60% and the design elastic strain DE1 of about 0.2%. Consequently, S1 reaches the design elastic strain SE0 at a strain DE1. E.g. at about 0.3%, (as 0.1% above DE0 of 0.2%). Consequently, for 0.4% to 0.5% in situ design thermal expansion, providing 0.1% bending strain relief would leave a 0.3% to 0.4% compressive strain in the tubular or base portions. S1 reduces residual compressive strain at design to 150% to 200% of a typical 0.2% elastic design level DE0, compared to a conventional 200% to 300% of DE0. Such bending relief may provide a strain relief fraction (FR) of 25% of a total thermal strain of 0.4%, or a relief fraction (FR) of 20% of a total thermal strain of 0.5%.

In other configurations, the bending members may be configured to provide 0.20% strain relief. This may provide a strain relief fraction (FR) of 50% of a total strain of 0.4%. It may provide strain relief of 40% of a total thermal strain of 0.5%. This 0.2% strain relief would provide 100% of the strain above the 0.2% elastic design level in configurations having 0.4% total strain. In liner having 0.5% total thermal strain, this strain relief would similarly provide 67% of the 0.3% strain above the design strain of 0.2%.

In further configurations, the bending members may be configured to accommodate thermal strain of 0.15%. E.g., this may provide a strain relief fraction (FR) of 38% of a total thermal strain of 0.4%. With an elastic design strain of 0.2%, such a strain relief configuration would accommodate up to 0.35% strain or 75% of the thermal strain in excess of the elastic design level.

Thermal Liner Configurations: Referring to notation in FIG. 2 to FIG. 4, the methods described herein may be used to provide configurations covering a wide range of outer slot widths (GO) from 0.1 mm (0.004 in) to 6.35 mm (0.25 in). The relative base fraction (CB/CL) of circumferential base length (CB) to circumferential repetition length (CL) may range from 5% to 40%.

In some configurations, the outer slot area (AS) and the number of slots (NS) may be configured to provide a prescribed slot area fraction (ASF) of the total outer slot area (AST) divided by the gross pipe outer surface area (AG). Table 3 shows examples of configurations able to provide Area Fractions (AF) of 2.5%, 5%, 10%, 20%, 30%, 40%, 60% and 80% assuming the relative base fraction (CB/CL) is 15%. Nine exemplary configurations of outer slot width (GO) are shown for common slot width ranges to demonstrate the method. E.g., at 0.10 mm (0.004 in), 0.15 mm (0.006 in), 0.25 mm (0.010 in), 0.38 mm (0.015 in), 0.51 mm (0.020 in), 0.64 mm (0.025 in), 0.76 mm (0.030 in), 0.89 mm (0.035 in), and 1.02 mm (0.040 in). For example for a desired slot width of 0.51 mm (0.020 in), an area fraction of 20% can be obtained by using configuration F5 with rod width ZO of 2.03 mm and wrapping 394 wraps per meter. Table 3 exemplifies configurations using rods from 0.03 mm to 39.62 mm wide. Intermediate area fractions may readily be used. In further configurations, other slot widths may readily be used for coarser materials. E.g. with rod widths may be selected as of 2 mm (0.08 in), 3 mm (0.12 in), 4 mm (0.16 in), 5 mm (0.20 in), 6 mm (0.24 in), and 7 mm (0.28 in). Other slot widths may readily be utilized as needed.

TABLE 3

Strain Relief Thermal Liner Configurations versus Area

| No. | Slot Width GO mm | Slot Width GO in | 2.50% | 5% | 10% | 20% | 30% | 40% | 60% | 80% |
|---|---|---|---|---|---|---|---|---|---|---|
| | | | \multicolumn{8}{c}{Rod Width ZO mm} |
| F1 | 0.10 | 0.004 | 3.96 | 1.93 | 0.91 | 0.41 | 0.24 | 0.15 | 0.07 | 0.03 |
| F2 | 0.15 | 0.006 | 5.94 | 2.90 | 1.37 | 0.61 | 0.36 | 0.23 | 0.10 | 0.04 |
| F3 | 0.25 | 0.010 | 9.91 | 4.83 | 2.29 | 1.02 | 0.59 | 0.38 | 0.17 | 0.06 |
| F4 | 0.38 | 0.015 | 14.86 | 7.24 | 3.43 | 1.52 | 0.89 | 0.57 | 0.25 | 0.10 |
| F5 | 0.51 | 0.020 | 19.81 | 9.65 | 4.57 | 2.03 | 1.19 | 0.76 | 0.34 | 0.13 |
| F6 | 0.64 | 0.025 | 24.77 | 12.07 | 5.72 | 2.54 | 1.48 | 0.95 | 0.42 | 0.16 |
| F7 | 0.76 | 0.030 | 29.72 | 14.48 | 6.86 | 3.05 | 1.78 | 1.14 | 0.51 | 0.19 |
| F8 | 0.89 | 0.035 | 34.67 | 16.89 | 8.00 | 3.56 | 2.07 | 1.33 | 0.59 | 0.22 |
| F9 | 1.02 | 0.040 | 39.62 | 19.30 | 9.14 | 4.06 | 2.37 | 1.52 | 0.68 | 0.25 |
| | | | \multicolumn{8}{c}{Specific Windings #/m} |
| F1 | 0.10 | 0.004 | 246 | 492 | 984 | 1969 | 2953 | 3937 | 5906 | 7874 |
| F2 | 0.15 | 0.006 | 164 | 328 | 656 | 1312 | 1969 | 2625 | 3937 | 5249 |
| F3 | 0.25 | 0.010 | 98 | 197 | 394 | 787 | 1181 | 1575 | 2362 | 3150 |
| F4 | 0.38 | 0.015 | 66 | 131 | 262 | 525 | 787 | 1050 | 1575 | 2100 |
| F5 | 0.51 | 0.020 | 49 | 98 | 197 | 394 | 591 | 787 | 1181 | 1575 |
| F6 | 0.64 | 0.025 | 39 | 79 | 157 | 315 | 472 | 630 | 945 | 1260 |
| F7 | 0.76 | 0.030 | 33 | 66 | 131 | 262 | 394 | 525 | 787 | 1050 |
| F8 | 0.89 | 0.035 | 28 | 56 | 112 | 224 | 337 | 450 | 675 | 900 |
| F9 | 1.02 | 0.040 | 25 | 49 | 98 | 197 | 295 | 394 | 591 | 787 |

For example, referring the notation in FIG. 2, FIG. 3, and FIG. 4 etc., one configuration F1 may provide an outer slot width (GO) of 0.1 mm using an outer winding width (ZO) of 2.27 mm rods at 421 windings/m giving a 5% outer slot area fraction (ASF). Similarly, a configuration F2 may use an outer slot width (GO) of 0.15 mm, with a winding width (ZO) of 2.9 mm and 328 windings/m for an area fraction of 5%; a configuration F3 with an outer slot width (GO) of 0.25 mm, may use a winding width (ZO) of 2.69 mm with 340 windings/m giving a slot area fraction (ASF) 10%; a configuration F5 may use an outer slot width (GO) of 0.51 mm with a winding width (ZO) of 2.39 mm at 345 windings/m to give a slot area fraction (ASF) of 20%; a configuration F8 with an outer slot width (GO) of 0.89 mm, with a winding width (ZO) of 2.44 mm at 300 windings/m may provide a slot area fraction (ASF) of 30%; a configuration F9 may provide an outer slot width (GO) of 1.02 mm, an outer winding width (ZO) of 1.79 mm with 356 windings/m to give a slot area fraction (ASF) of 40%.

Some examples of configurations C1, C2, C3, C4 and C5 of corrugated thermal strain relief liner as depicted in FIG.

2 are shown in Table 4 for 177.8 mm (7") diameter thermal liner. Similar configurations C1', C2', C3', C4' and C5' are shown for 244.5 mm (9.63") diameter thermal liner.

TABLE 4

| | Cy/Rv | 3.5 | 5.5 | 7.5 | 9.5 | 11.5 | 13.5 | 15.5 | 17.5 |
|---|---|---|---|---|---|---|---|---|---|
| Corrugated Thermal Strain Relief Liner Design 177.8 mm (7") | | | | | | | | | |
| C1 CB | 1 | 19.9 | 12.7 | 9.3 | 7.3 | 6.1 | 5.2 | 4.5 | 4.0 |
| CS | 3 | 59.8 | 38.1 | 27.9 | 22.0 | 18.2 | 15.5 | 13.5 | 12.0 |
| C2 CB | 1 | 13.3 | 8.5 | 6.2 | 4.9 | 4.0 | 3.4 | 3.0 | 2.7 |
| CS | 5 | 66.5 | 42.3 | 31.0 | 24.5 | 20.2 | 17.2 | 15.0 | 13.3 |
| C3 CB | 1 | 10.0 | 6.3 | 4.7 | 3.7 | 3.0 | 2.6 | 2.3 | 2.0 |
| CS | 7 | 69.8 | 44.4 | 32.6 | 25.7 | 21.3 | 18.1 | 15.8 | 14.0 |
| C4 CB | 1 | 8.0 | 5.1 | 3.7 | 2.9 | 2.4 | 2.1 | 1.8 | 1.6 |
| CS | 9 | 71.8 | 45.7 | 33.5 | 26.5 | 21.9 | 18.6 | 16.2 | 14.4 |
| C5 CB | 1 | 6.6 | 4.2 | 3.1 | 2.4 | 2.0 | 1.7 | 1.5 | 1.3 |
| CS | 11 | 73.1 | 46.5 | 34.1 | 26.9 | 22.3 | 19.0 | 16.5 | 14.6 |
| Corrugated Thermal Strain Relief Liner Design 244.5 mm (9.63") dia | | | | | | | | | |
| C1' CB | 1 | 27.4 | 17.5 | 12.8 | 10.1 | 8.3 | 7.1 | 6.2 | 5.5 |
| CS | 3 | 82.3 | 52.4 | 38.4 | 30.3 | 25.0 | 21.3 | 18.6 | 16.5 |
| C2' CB | 1 | 18.3 | 11.6 | 8.5 | 6.7 | 5.6 | 4.7 | 4.1 | 3.7 |
| CS | 5 | 91.4 | 58.2 | 42.7 | 33.7 | 27.8 | 23.7 | 20.6 | 18.3 |
| C3' CB | 1 | 13.7 | 8.7 | 6.4 | 5.1 | 4.2 | 3.6 | 3.1 | 2.7 |
| CS | 7 | 96.0 | 61.1 | 44.8 | 35.4 | 29.2 | 24.9 | 21.7 | 19.2 |
| C4' CB | 1 | 11.0 | 7.0 | 5.1 | 4.0 | 3.3 | 2.8 | 2.5 | 2.2 |
| CS | 9 | 98.7 | 62.8 | 46.1 | 36.4 | 30.1 | 25.6 | 22.3 | 19.7 |
| C5' CB | 1 | 9.1 | 5.8 | 4.3 | 3.4 | 2.8 | 2.4 | 2.1 | 1.8 |
| CS | 11 | 100.6 | 64.0 | 46.9 | 37.1 | 30.6 | 26.1 | 22.7 | 20.1 |

Table 4 exemplifies corrugated configurations with the number of corrugation cycles per circumference of 3.5, 5.5, 7.5, 9.5, 11.5, 13.5, 15.5, and 17.5. The ratio of circumferential base length CB and circumferential slot length CS are selected as 1:3 for C1; 1:5 for C2; 1:7 for C3; 1:9 for C4; and 1:11 for C5 etc. For example, in configuration C3, a 179 mm (7") OD pipe may be formed with 7.5 corrugation cycles per circumferential wrap and a base to slot ratio CB/CS of 1:7 to provide base lengths CB of 4.7 mm and slot lengths CS of 32.6 mm. Similarly configuration C2' may form a 244.5 mm (9.65") pipe with 11.5 corrugations per circumferential wrap. Selecting a ratio CB to CS of 1:5 will then give a base length CB of 5.6 mm and slot length CS of 27.8 mm. Other ratios may be readily selected. E.g. ratios CB/CS may readily range from 1:1.5 to 1:20, or from 1:1.1 to 1:30. This ratio may be adjusted and/or the bonding method adjusted to provide a prescribed torsional strength about the liner axis.

"Geared" thermal liner: Some situations have higher torsional design requirements. For such applications, the strain relief thermal liner may be configured with transversely overlapping rod patterns to provide rod to rod azimuthal interference capable of providing substantial shear torsional capacity by the shear strength of the overlapping sections. For example, referring to FIG. 4, some "geared" liner configurations may use "gear" type patterned rods where a transverse outdent or "tooth" 64 with axial minimum to maximum axial height ZT in one rod 59B fits into a complementary transverse indent, gap, or socket 65 in an adjacent rod 59A with a corresponding axial peak to depth gap ZG.

In such configurations, adjacent rods may axially interface along adjacent base sections 43 between bending members 45 within corresponding circumferential base lengths CB. The tooth 64 on rod 59B and socket 65 on rod 59A may be configured to form a filter relief slot 127 between the outer end of the tooth and inner end of the socket. These teeth and sockets form slots 127 aligned with the helical winding direction, with an outer slot or gap with GO and an inner slot or gap width GI. The axial overlap ZV between tooth 64 and gap 65 over circumferential length CB may be bonded by welding, brazing or soldering to form a joint with an angled bond 96.

With a given shear strength, such a "geared" liner with an inner diameter and outer diameter may be configured to provide a prescribed torsional design strength about the axis Z that may be greater than 20% of the torsional strength of a solid pipe of equal inner diameter and outer diameter made of the same material. I.e., the cross sectional area of bonded teeth in a plane perpendicular to Z transecting one tooth to socket bond may be configured between 20% and 50% of the cross sectional area of the liner taken in that plane. In some configurations, the "geared" liner's mean tooth cross sectional area and corresponding torsional strength may exceed 35% of the torsional strength of the solid pipe having equal inner and outer diameters of the same material. Some geared configurations may be configured with equal circumferential shear area in a plane through teeth on adjacent windings, giving a torsional strength approaching 50% of the solid pipe's torsional strength.

Contact Angle: Further referring to FIG. 4, when wound, the running rod axis X' is aligned with the helical axis H at an angle to the circumferential or tangential direction T (or X). A gear angle TG between the helical axis H (rod axis X') and the tooth-socket side contact may be configured to provide a prescribed tooth to socket contact shear strength. The higher this TG base to base contact gear angle to the helical angle, the lower the shear strength required for the angled tooth to contact bond to fail in shear. E.g., some embodiments may form the gear angle TG greater than about five degrees, ten degrees or twenty degrees. Other embodiments may increase this gear angle Tg to about thirty degrees, forty five degrees, sixty degrees, seventy degrees, or eighty degrees.

The methods shown in Table 3 and Table 4 may similarly be used to configure "geared" strain relief filter liners such as shown in FIG. 4. A prescribed torsional strength about the liner axis may be obtained by adjusting the overlap ZV and respective bonds connecting adjacent "geared" rod windings 59A and 59B etc. The "geared" rods 59A may have a circumferential repetition length (CL) of (2*CB+2*CS) comprising a tooth 64 and socket 65 along a geared rod 59A, 59B, or 59C.

Wound liner assembly: Referring to FIG. 5, in some embodiments the relief liner 10 may be formed using profiled rod 55. This rod profiling may begin by straightening wire or rod 55 using a straightener 141. This straightening may include flattening two opposing sides of rod 55 sufficiently to form the bonding surfaces of starboard bases CRS 42 with corresponding port bases CRP 42 as shown in FIG. 2.

Referring to FIG. 5, in some configurations, the profile of rod 55 may be formed using a strip mill 142. E.g., the profiled rod may be corrugated or formed into a "geared" configuration with outdents and indents, such as with a corrugating, stamping, or forging mill 144.

In some configurations, the rod 55 may be formed by slitting coil steel with a slitter. The slit rod may be bonded into longer reels of rod 55 as appropriate. The slit rod 55 may then be fed into the straightener 141 as needed and then to profile strip mill 142 as above.

Forming rod profiles: Referring to FIG. 5, the rod 55 may be formed into a prescribed radial cross section (e.g. see plane YZ in FIG. 3). The profile or strip mill 142 may be used to flatten wire or rod into a rectangular rod, and to change the width to height ratio of the rectangular rod. The profile mill 142 may include a "turks head" to modify the profile such as by changing the angle of the rod sides, such as to form the (YZ) radial cross sectional profile to a trapezoidal or triangular "wedge" profile, as is known to the art. E.g., in some configurations, the rod (YZ) radial profile may be formed into an arched rod, such as shown as windings 55A and 55B in FIG. 3 or 55A through 55D in FIG. 8.

In other configurations, the rod's (YZ) radial profile may be configured into an I-beam rod such windings 59A, 59B, and 59C in FIG. 7 or as windings 59A, 59B, 59C and 59D in FIG. 9. The rod profile may be configured to adjust the relative dimensions of the radially inner, middle, and/or outer rod axial widths. E.g., the rod's outer I-beam flange 56 may be configured wider than intermediate web 58 and of the inner flange 57, so as to configure the outer slot gap GO narrower than the inner slot gap GI.

The rod (YZ) profile may further be modified to adjust the (YZ) rod profile curvature. E.g., in some configurations, one of the outer arch corner radii, the convex inner arch corner radii, and the inner concave arch to web radii may be formed to about a prescribed radii, or to within a prescribed radii range. In other configurations, the curvature of one of the outer flange corner radii, the convex inner flange corner radii, and the concave inner flange to web radii may be formed to a prescribed radii, or to within a prescribed radii range.

Referring to FIG. 5, this shaped rod may then be further transversely formed through a corrugation or gear mill 144. This may form axial outdents and/or indents such as shown in FIG. 4. Alternatively, spacers 62 may be bonded onto the shaped rod as in FIG. 7. The corrugation mill may form the shaped rod into corrugations 55 such as shown in FIG. 1 or FIG. 2. Similarly, the shaped rod may be formed into teeth and sockets or "gear" shapes 59B such as shown in FIG. 4.

Referring to FIG. 5, the shaped, corrugated, and/or "geared" rod may then be wound into a liner using a coiler/filler 146. E.g., to form wound liners such as shown schematically in FIG. 1, FIG. 2, FIG. 4, FIG. 7, FIG. 8, and FIG. 9. This may include filling with filter media such as shown in FIG. 7.

Rod corrugating: FIG. 10, shows a schematic plan view of a corrugator 12 straightening and corrugating a rod 55. In some configurations, a rod 55 with an I-beam profile may be straightened and then corrugated to form a corrugated I-beam profiled rod such as is shown in FIG. 8 and FIG. 9.

A set of eccentric asymmetric opposed cams CA1 and CB1 may be used with multiple pairs of upstream symmetric rollers CS1 and CS2, to transversely corrugate rod 55 into port corrugations CRP and starboard corrugations CRS. This may be followed by a second set of asymmetric opposed cams CA2 and CB2 at a distance L12 from cam set CA1-CB1, and optionally by a third set of asymmetric opposed cams CA3 and CB3 a further distance L23 from asymmetric cam set CA2-CB2. To progressively increase the corrugations in rod 55, cam set CA3-CB3 may be more eccentric than cam set CA2-CB2, which in turn is more eccentric than cam set CA1-CB1.

FIG. 11 shows a plan view schematic detail of one of the eccentric asymmetric forming cams rotating on a cam shaft 173 of diameter DS, driven by cam drive 178. E.g. cam CA3. To form the rod bases, the asymmetric cams may have near forming arc AN and far forming arc AF. The near forming arc AN typically has radius RN subtending angle TN. The far forming arc AF typically has a radius RF subtending angle TF. Near forming arc AN is generally equal in circumferential length to the far forming arc AF, and both are about equal to the desired circumferential base length CB in rod 55.

Referring to FIG. 11, cam surfaces corresponding to arc AN and far arc AF may be joined by intermediate surface arcs AM, AO and AI to form bending members between bases in the corrugated rod windings. E.g., cam surface AO may be provided to follow the I-beam outer flange 56, cam surface AI to follow the I-beam inner flange 57, and arc AM (to follow the I-Beam web 58 in FIG. 9.) Through axis B-B' perpendicular to axis A-A', the cam has an intermediate radius RM for intermediate profile AM to form the intermediate rod width, compared to the profile AO to form the outer rod width.

The near and far arcs AN and AF and adjoining sections AO, AB, and AI may be configured to provide for spring back of the rod as it is being formed, so as to form rod base portions with generally matching flat base sides that can be readily bonded together.

FIG. 12 shows a schematic elevation section view of cam CA3 through section A-A'. Cam CA3 is mounted on a cam shaft 173 of diameter DS and extends from near radius RN to far radius RF along section A-A'. One or more of the opposed asymmetric cam sets CA1-CB1, CA2-CB2 and CA3-CB3 may be driven to draw rod 55 through the corrugator and to corrugate it. E.g., Cam CA3 on shaft 173 may be driven by cam drive 178.

Rod 55 may be radially (vertically) constrained by sets of rollers 170 above and below, comprising rollers 172 on a roller shaft 174 constrained by bushings or bearings 175, as the rod 55 is being straightened and corrugated. Roller shafts 174 may be driven by roller drive 176 to move rod 55 through the corrugator. FIG. 12 shown a cam CA3 elevation section for flat mating surfaces the full height W of the rod such as spacer sections 66 shown in FIG. 7.

This A-A' cam section of FIG. 12 may be adapted to accommodate multiple flat mating surfaces, such as mating surfaces 68 in arched rod 55E shown in FIG. 8, and multiple mating surfaces on the outer and inner I-Beam flanges 56 and 57 shown in FIG. 9.

FIG. 13 shows a schematic elevation section view of cam CA3 taken through section B-B' shown across the intermediate portion of cam CA3 shown of FIG. 11, and perpendicular to the section A-A' shown in FIG. 12. In FIG. 13, cam CA3 is mounted on shaft 173 of diameter DS driven by cam drive 178. This cam surface may form or follow the bending member as needed. It may form the mirror image of the I-beam cross section, such as shown in FIG. 9, with an intermediate radius RM to the outer portion corresponding to the I-Beam web 58. The I-beam's radially outer flange 56 may be accommodated by insetting the vertically outer portion of the cam CA3 by a differential distance DGO from the outermost portion of the cam. The I-beam's radially inner flange 57 of FIG. 9 may be accommodated by insetting the vertically inner portion of cam CA3 by a differential distance DGI from the radially outermost portion of cam CA3.

In other configurations, an arched corrugated rod such as is shown in FIG. 2. and FIG. 3 may be straightened and corrugated. Similar corrugators may be used to form an arched corrugated rod 55 with multiple contact surfaces 68 such as is shown in FIG. 8. E.g., FIG. 14 shows a schematic elevation section view of cam CA3 through section B-B' (such as corresponding the arched rod shown in FIG. 3.) Cam CA3 on shaft 173 of diameter DS may be driven by cam drive 178. The cam recess to the differential distance DGO in from the radius RM accommodates the rod's outer arch that forms the keystone outer slot when facing a corresponding arched rod. E.g., down to a distance WM from the inner radius of the rod winding. This cam recess may be configured with a radius RB (such as corresponding to the rod's outer arch of FIG. 3.)

Referring to FIG. 13, cam CA3 may be adjusted such that the upper (or radially outer) differential dimension DGO is greater than the lower dimension (or radially inner diameter) DGI by the differential change in outer to inner width of rod 55, plus the desired difference in outer slot width to inner slot width sufficient to form a keystone like filter slot. Similarly in FIG. 14, cam CA3 is configured so that the differential distance DGO is adjusted to compensate for the change in radial outward to inward width due to winding, in addition to the desired difference in outer to inner slot width to provide a keystone like slot shape with the desired outer slot width.

In some configurations, the rod may be straightened using a straightener having at least three sets of straightening rollers upstream of the corrugator.

Filter media: Referring to FIG. 5, in some configurations, suitable filter media 114 may be added as the thermal liner is wound by coiler/filler 146 to form a filter media liner such as shown in FIG. 7. This may be facilitated by orienting the winding process to feed the patterned rod 59 down from the top with the liner being configured with its axis about horizontal. This permits gravity feed of filter media down between the feed rod 59 and the previous helical wrap on the liner.

Referring to FIG. 5, the coiled liner may then be processed by a welder/trimmer/cutter 148 to form liner 10. E.g. a laser and/or welder may be used to weld adjacent bases together to form bonds between bases. E.g. such as bonds 92, 94 and/or 96, as shown in FIG. 2, FIG. 4, FIG. 7, FIG. 8, and FIG. 9.

Referring to FIG. 5, in some configurations, the shaped rod being wound or the wound liner 10 may be laser trimmed by bonder/trimmer/cutter 148. E.g., one or two lasers may be used to trim one or more rods such as shown in FIG. 3. The residual shaped rod and/or assembled liner may then be trimmed or cut to final shape. Robotic mirrors and/or positioners may be used to move the cutting, bonding or welding processes relative to the liner 10. The liner may then be cut off to formed liner 10. This liner 10 may have threaded ends, sockets, and/or couplings attached as desired.

Referring to FIG. 5, persons skilled in the art will understand that these processing steps may be rearranged, and/or further combined or divided using techniques known to the art. For instance, the trimming process shown in FIG. 3 may be performed on the shaped rod after the profile strip mill 140, or after winding the liner 10. Such trimming may also be performed using a machine cutter or grinder.

Referring to FIG. 5, in other configurations, the rod profile shaping by profiler strip mill 140 may be exchanged with the corrugation gear mill 144. In further configurations, one or more of the steps of profiling, corrugation, "gear" shaping, and/or coiling may be performed using in multiple unit steps of rolling, smoothing, trimming, bending, pressing, forming, and/or stamping.

Referring to FIG. 4, in some configurations, a patterned rod 59A may be coil wound to provide a spring force holding adjacent windings together. E.g., with outdent 64 in rod 59B into indent 65 in adjacent rod 59A while forming slot 127 between remaining bending members 45 on 59A and 59B. This spring force may be configured to enable this thermal liner to bend during insertion while holding adjacent windings together to prescribed widths for filter slot 127 when in place.

Shaped corrugated helical liner: FIG. 2, shows a corrugated strain relief thermal liner 10 configuration with axial direction Z, azimuthal or circumferential direction X, and with helical winding direction H. Liner 10 may be formed by winding shaped corrugated rod. The length of the corrugations may be configured relative to the liner circumference such that helically winding corrugated rod forms corrugated windings 55A and 55B providing corrugated strain relief slots 126 between oppositely oriented corrugations.

Referring to a detailed section of FIG. 1 in FIG. 2, the corrugation length CL on rod 55A may be formed with a port base CRP 42, a port to starboard member 45 of length CM, a starboard base CRS 42, and a starboard to port oriented member 45 of length CM. (See also FIG. 4). Correspondingly, the adjacent rod 55B has a starboard base CRS 42, a starboard to port oriented member 45 of length CM, a port base CRP 42, and a port to starboard orienting member 45 of length CM. In these configurations, the corrugation length CL is equal to 2*CB+2*CM.

In some configurations, the corrugation length CL of corrugated rod windings 55A and 55B may be configured such that the circumferential base 42 alignment in a first wrap 55A overlaps a bending member 45 in the adjacent wrap 55B and is offset from the nearest base 42 in that adjacent wrap 55B. Such offset corrugated alignment forms corrugated filter relief slots 126 of length CS between the port CRP sequences of 55A and starboard sequences of 55B. Similar relief slots 126 of length CS may be formed between other adjacent corrugated wraps.

Referring to FIG. 2 and FIG. 3, the corrugation method comprises configuring corrugations of length CL such that a prescribed bending liner circumference (2*Pi*radius RO) lies between an integral number N of corrugations of length CL plus one base length (N*CL+CB) and an integral number (N+1) corrugations of length CL minus one base length ((N+1)*CL−CB). Equivalently this is less than that number N of corrugations plus the base length plus two bending member lengths (N*CL+CB+2*CM). I.e., (1+2*N)*CB+2*N*CM<2Pi*RO<(1+2*N)*CB+(2+2*N)*CM.

The overlapping section of adjoining starboard base CRS 42 with a port base CRP 42 may be suitably bonded, such as by welding, brazing or soldering to form an azimuthal bond 92. The base 42 length and dimensions of bond 92 may be configured to sustain the liner bending and liner torque caused by commercial installation and/or ground displacement.

In these configurations, the corrugation length CL is shown about equal to the circumferential slot length CS plus the base length CB. In these configurations, the circumferential offset CO may be equal to the base length CB plus the bending member length CM, or about half the circumferential length CL. While symmetric configurations are preferred, other configurations may comprise corrugations with bending member having uneven circumferential lengths and/or base portions having uneven circumferential lengths Dynamic bonding: Referring to the perspective view in FIG. 8 of forming liner 10, in some configurations, patterned rods may be formed to provide complementarily fitting upper and lower base surfaces 68 on adjacent wraps such as in wraps 55A to 55E. These complementary base surfaces 68 may be dynamically heated sufficiently to melt the surfaces on a pair of starboard an port bases CRS and CRP as a patterned rod 55E is being wound into the liner 10. When matching surfaces 68 of base pairs CRS and CRP are brought together, they may then be rapidly bonded to "bridge" between the adjacent base pairs CRS and CRP between wrap of patterned rod 55D and feed patterned rod 55E.

One or both of the wound patterned rod 55D and the patterned rod being wound 55E may be preheated. Referring to FIG. 8, a first laser 80 may then be used to melt the surface 68 of an exposed first base surface CRS in previously wound rod 55D. A second laser 89 may similarly be used to heat the corresponding exposed second surface on complementary base CRP on rod 55E that is being wound into the liner. Such preheating may include inductive heating of the patterned rod 55E as it is being wound and bonded to adjacent wrap 55D, such as is shown in FIG. 9.

In FIG. 8, the rate of laser heating using lasers 80 and 89 may be adjusted to melt sufficient of the base surfaces 68 as to provide greater bonded area than a prescribed bonded base surface area when the surfaces 68 of the base pair CRS and CRP are brought together, where the base surfaces have a roughness less than a prescribed roughness limit.

The laser heating rate may be adjusted to limit surface ablation to below a prescribed material loss factor. The laser beams may be scanned in the Y axis, across the height W of the patterned rods, to provide a desired heating uniformity. Similarly, the laser beams from lasers 80 and 89 may be controlled to follow the tangential motion in the X direction of the base pair surfaces 68 as the liner 10 is rotated and rod 55E is wound onto it. Equivalently, the lasers may be moved about the Z axis to track the surfaces 68 as rod 55E is wound onto winding 55D of a non-rotating liner 10.

In FIG. 8, an electric heater 150 may be used to heat adjacent base pairs or to bond them. E.g., a spot welder may be used to contact a first electrode 152 to wrap 55D, and a second electrode 154 to winding 55E. Electrodes 152 and 154 may be connected to a suitable power supply 158 and a power/welding controller 156. Other methods known to the art may also be used, such as inductive heating or flame heating.

Referring to the perspective view FIG. 9 of forming liner 10, in one configuration, an I-beam shaped rod 53D may be corrugated to form bases 42 and bending members 44 such that contact surfaces 68 on complementary starboard and port bases CRS and CRP in adjacent windings contact each other in windings 53C and 53D, when wound to a prescribed diameter or circumference in forming liner 10. As the 53D rod is being coiled and wound, one of the base pairs of rods 53C and 53D, being formed between complementary starboard base CRS and port base CRP, may be heated with one or more induction heaters 180 connected to a suitable preheater power supply 158A and preheater controller 156A. Coolant flow F10 may be provided to control the temperature of induction heater 180 below a prescribed operating temperature.

Referring to FIG. 9, the induction heater 180 may be positioned between the bases CRS and CRP from inside the wound liner. Induction heater 180 may be moved about the liner axis to move with the base pair CRS-CRP while the bases are being heated. Then the induction heater may be withdrawn and repositioned to the next pair of complementary bases coming into position as the rod 55D is wound onto the liner.

As schematically shown in FIG. 9, one or more laser heaters 100 and 101 may be used to heat the complementary bases on the shaped rod as it is wound onto the liner. The laser beams may be directed onto the base surfaces from outside and/or inside the liner as needed. In some configurations, these lasers 100 and 101 may heat the one or both surfaces of the complementary bases sufficient to melt the base surfaces to a prescribed degree. E.g., heating the surfaces to a combination of temperature and depth such that the surfaces bond when brought together as the rod is wound into the liner. In other configurations the lasers may preheat the bases sufficient for subsequent bonding methods.

The shaped rod being wound may then be positioned against the liner to bring the complementary base surfaces together. Resistive ("Spot") welder 150 may position welding electrodes 152 and 154 up against the rod wrap being wound and the adjacent liner wrap, with the electrical feeds to welder power supply 158B and welding controller 156B. Electrical current may then be provided through the rod and liner electrodes to deliver current through the complementary bases sufficient to resistively heat the bases to a prescribed degree to bond the complementary bases together.

Further referring to FIG. 9, in other configurations, one or more laser heaters 89 may be positioned outside and/or inside the liner to heat one or both of the complementary base surfaces as they are being brought together or after they are in contact. This may form a surface bond across the complementary base surface. Laser heater 89 may also be used to melt the outer and/or inner edges of the adjoining base pair to form an outer and/or inner bond.

In some configurations, an electric arc heater may be used to provide heating and bonding of the base pairs. E.g., a Gas Metal Arc Welder (GMAW), or Metal In Gas (MIG), or Metal Active Gas (MAG) welder. This may be combined with the laser heater 89 in a hybrid heating and bonding system.

Further referring to FIG. 9, in some configurations, the liner surface may be heat treated to provide a prescribed degree of surface hardening. For example, an inductive heater 181 may be provided to heat treat the surface of one or more of wraps 59A, 59B and 59C of liner 10. Heater 181 may be powered by corresponding inductor power supply 158C and inductor controller 156C. Similarly a laser heater (similar to laser heaters 100 and 101) may be used to heat treat the liner surface to harden it.

In some configurations, the liner 10 is rotated as the rod 59D is fed towards it to form the next winding. In other configurations, the liner 10 may not be rotated while the rod 59D is wound onto it. One or more inductive, laser, and conductive heating systems may be configured to complement the respective liner and rod motion.

Other combinations of inductive heating, laser heating, electric resistive heating and electric arc heating may be used to heat, melt, and bond the complementary base pairs as the shaped rod is wound onto the liner.

Forming Geared Rod: Referring to the schematic elevation view of FIG. 15, in some configurations, a straightened rod 59S may be formed into a geared rod configuration 59G. E.g. by using a stamping or forming press 189, such as is shown in FIG. 4. For example, straightened rod 59S may be fed into the press with a incremental feeder 182 with a suitable process buffer loop for rod 59S. Press 189 may have a lower mold 184 and an upper mold 185 between a press bed 183 and a press hydraulic ram 186. Geared rod 59G may be withdrawn by an incremental rod takeup 188 which may provide a buffer loop for rod 59G.

Each of the lower mold 184 and upper mold 185 may comprise a progressive set of molds to progressively form the straightened rod 59S into geared rod 59G. E.g., various progressive press configurations may use from two to ten sets of forming molds to facilitate pressing while reducing stresses and/or the power required for the press. In one configuration, four progressive mold sets may be used, schematically indicated as ML1, ML2, ML3, and ML4 lower molds and MU, MU2, MU3, and MU4.

To reduce intermediate handling and storage, the progressive press 189 may be configured and controlled to match speed rates from upstream profiling and straightening systems, and downstream coiling and bonding systems, with their respective feed and take up systems. Profiling strip mills may process 1 m/s to 10 m/s (200 ft/min to 2,000 ft/min). Profiling presses may run to 1,000 stamps per minute. For example, in some configurations, the coiling equipment may run at 1.52 m/s (300 ft/min). To feed a stamping mill running 240 to 300 stamps per minute, the incremental feeder 182 and take up 188 may feed straightened rod 59S in and geared rod 59G out at about 6.4 mm/s to 5 mm/s (1.25 ft/min to 1 ft/min).

The incremental geared pattern repetition length may be a half integral portion of the prescribed liner circumference. For example, configuring 7.5 pattern repetitions each of length CL around a 177.8 mm (7 in) outer diameter pipe, each pattern repetition has a length of 74.5 mm (2.92 in). A press rate of 240 to 300 stamps per min would give feed rates of 0.30 m/s to 0.37 m/s (58 ft/min to 73 ft/min).

Further referring to FIG. 15, to handle the higher prescribed feed rates, each of the lower and upper sets of molds may comprise multiple instances of the geared repetition pattern. While configurations generally use from two to twenty mold sets, some configurations may use four to eight subsets. In this configuration, about six or four mold subsets could be used to match the desired coiler feed rate of about 1.52 m/s (300 ft/min). E.g., the configuration shown in FIG. 15 shows four sub mold sets A, B, C and D for each of the progressive upper mold sets MU1, MU2, MU3 and MU4 and respective lower mold sets, to match a stamping frequency of 300 stamps per minute.

A schematic detail elevation view of one of the sub mold sets of FIG. 15 is shown in FIG. 16, corresponding to the geared configuration of FIG. 4. This sub mold set C shows a portion of the fourth lower mold set ML4 and fourth upper mold set MU4. The lower mold subset ML4C and upper mold subset MU4C are shown in the open configuration sufficiently far apart to freely move geared rod 59G transversely between them.

The lower and upper molds 184 and 185, as depicted in FIG. 15 and FIG. 16, may be configured to provide a desired cross-sectional shape in straightened rod 59S as it is pressed into geared rod 59G. E.g., the molds may be configured corresponding to FIG. 14 to form an arched rod cross section such as shown in FIG. 3 or FIG. 8. In some configurations, molds may be configured corresponding to FIG. 13, to form an I-beam cross section with keystone shaped filter slots, such as slots 34 in FIG. 7 and slots 35 shown in FIG. 9. The molds may be configured to form rods with trapezoidal cross sections with axially wider radially outward portions and axially narrower radially inner portions. The base sections to be formed may be continuous sections 66 such as shown in FIG. 7, or have radially multiple spacer portions 68 such as shown in FIG. 8.

Coiling Compensation: Coiling or winding rods axially unconstrained along the liner axial Z direction typically causes the radially inner portion to widen in the axial Z direction while the radially outer portion will narrow axially, from conservation of mass. In some configurations, a precoiling compensation may be applied to compensate for this shape change due to coiling. E.g. this precoiling compensation or adjustment may be inversely in proportion to the radii of the rod portion from the liner axis after it is coiled and wound into the liner. In some configurations, the rod cross section may be adjusted as it is coiled, by using rollers to increasingly narrow the rod's radially inner portion as it is being coiled.

For example, FIG. 17 schematically shows a compensated elevation cross section of arched rod 53A compared to an uncompensated cross section 53B. Equivalently, cross section 53B may represent the cross section of one configuration after the rod is wound. The compensation to rod 53A may include increasing the radially outer axial rod width from ZO to ZOC, increasing the intermediate rod width from ZM to ZMC at a radial height WM from the inner radius RI for a rod depth W from inner liner radius RI to outer liner radius RO, and/or reducing the radially inner axial rod width from ZI to ZIC.

The compensated shape may be stretched radially to a compensated depth WC longer than the final depth W. This may results in an initial nominal compensated inner radius RIC less than the final radius RI, and/or a compensated outer radius ROC (as the rod begins to be wound) greater than the final wound outer radius RO. This intermediate compensated configuration may give an intermediate compensated outer gap narrower than the final gap width GO and an inner gap width for slot 128 greater than GI. Such compensation is conducted to form flat mating or parallel surfaces sufficient to bond between alternating base pairs.

Such compensation for winding may be applied to corrugated configurations such shown in FIG. 2. The cams to form rod 55 in FIG. 10, such as cam CA3 may be tapered to form sides extending outward from radially inward to outward, to compensate for the reduction in outer width relative to the inner width that occurs on subsequent winding or coiling. E.g., referring to FIG. 11 and FIG. 12, the near side 179N and far side 179F (along A and A') forming arcs AN and AF of cam CA3 may be adjusted outward at the top by the compensation angle TC to compensate for winding such as shown in FIG. 17. This beneficially forms flat mating or parallel sides of alternating base pairs on adjacent windings of rod 55 after coiling.

In some configurations of the embodiment shown in FIG. 18, the socket angle TS may be configured between five degrees and eighty nine degrees, with the complementary top angle TT ranging from eighty five degrees to one degree. In further configurations, the angle TS may be configured between about eighty and eighty eight degrees, with an angle TT configured to two degrees to ten degrees with the liner radial direction R, (or from the perpendicular to the rod top.)

To compensate for transverse deformation from coiling, the lower and upper molds 184 and 185 may be transversely canted or configured to form wider radially outer widths and narrower radially inner widths in the geared rod cross section. The radial coiling compensation provided in the stamping press may be adjusted to compensate for such downstream rod adjustment.

The rod pressing methods described to form geared I-beam 59G may be adapted to form a corrugated I-beam rod as shown in FIG. 9. The rod pressing methods may be used to form corrugated arched rods such as shown in FIG. 2 and FIG. 8. Corrugated trapezoidal rods or corrugated triangular shapes may be formed by one or more of the rod pressing methods described herein.

Stepped gear configuration: FIG. 18 depicts a schematic plan view of a geared configuration with exaggerated axial dimensions and foreshortened circumferential dimensions. In such configurations, rods may be formed into geared configurations having steep teeth and socket edges with a small gear top angle TT to the perpendicular to the helical axis. In one exemplary configuration, the gear top slope TT may be selected from 1 degree to 50 degrees. A step of circumferential length CB may be provided that provides a contact between adjacent geared rods between slots of circumferential slot length CS with a circumferential repeat length CL. Axial step to step distance is noted as ZR with a socket depth ZS from the step and a tooth height ZT from the step with tooth to slot circumferential design tolerance of CT gives a radially inner slot gap width of GI.

In some configurations, repeat length CL may be 74 mm (2.9 in), with a pattern offset CO of 25% of the repeat length CL. In these configurations, rod radial depth may be selected from 2 mm to 10 mm (0.08 in to 0.4 in) depending on the compression strength required. The teeth and sockets may be pressed to about 0.66 mm (0.027 in) axially out and in from the rod "top" and "bottom" as it is passed through a forming press. Such configurations may provide a base CB from 0.13 mm (0.005 in) to 0.30 mm (0.012 in). For shallow SAGD applications, such configurations may use 276 MPa (40,000 psi) steel.

The Energy Resources Conservation Board (ERCB), Calgary Alberta Canada, provides a Directive 010 (revised Dec. 22, 2009) for pipe design. Table 2 provides an example of design parameters comparing a conventional axially slotted thermal liner with one of the helical design configurations as described herein.

TABLE 2

Comparisons of Helical versus Axially slotted Thermal Liner Design

| | Depth | | | Multi- |
|---|---|---|---|---|
| | 75 m | 250 m | 750 m | plier |
| Collapse Pressure | 1.8 MPa 261 psi | 6 MPa 870 psi | 18 Mpa 2,461 psi | |
| Axial slot design | 12 MPa | 40 MPa | 160 MPa | 6.67 |
| Helical design pressure | 2.25 MPa 326 psi | 7.5 MPa 1,088 psi | 22.5 MPa 3,263 psi | 1.25 |
| Axial slot wall thickness | 6.91 mm J55 | 9.19 mm L80 | NA | |
| Helical wall thickness | 5.87 mm H40 | 5.87 mm H40 | 8.05 mm J55 | |
| Relative axial slot cost | ~150% | 234% | NA | |
| Relative helical slot cost | 100% | 100% | ~140% | |

External fluid gradient 12 kPa/m; Design factor 2; Support ring: Axial 15%, Helical 80%

Thermal liners for SAGD bitumen recovery are currently used at relatively shallow depths though deeper resources exist. Depths of 75 m (246 ft) and 250 m (820 ft) are assumed in Table 2 as typical of the range of depths for current commercial SAGD. E.g. in Alberta SAGD is commonly in the range of 125 m to 200 m. A depth of 750 m (2,461 ft) is shown as exemplary of deeper bitumen resources, while deeper resources exist.

For preliminary design, ERCB's external fluid gradient of 12 kPa/m (0.53 psi/ft) may be assumed to give collapse pressures of 1.8 MPa, 6 MPa, and 18 MPa respectively. ERCB's collapse pressure minium design factor of 1.6 may be assumed above surrounding pressure based on an evacuated pipe. An additional nominal 1.25 safety factor may be applied to account for bending, tension, and torsion etc. to give a total design factor of 2.0. Detailed Finite Element Analysis (FEA) may be applied for commercial design. E.g., to fully evaluate compression, bending, and torsional stress design requirements.

The axially unslotted ring that supports the pipe from collapse is assumed to be 15% of the pipe length for a typical prior art axially slotted thermal liner. I.e., this ring supports the compressive force on the 85% of pipe's length that is axially slotted. By contrast, a high filter fraction helically wound configuration (as described herein) is assumed with 80% axially unslotted ring giving a filter slot portion comprising 20% of the axial length. These give multiplying factors of 6.67 for the axially slotted liner compared to 1.25 for this helical design configuration. Thus, this helical design configuration has a 533% advantage (0.80/0.15) in its ability to withstand collapse over the conventional axially slotted design, due to the increased circumferential ring material.

Some measure of the benefit of the present helical design over the axially slotted design is shown as follows: For 75 m depth, the helical design bending members nominally require but 2.25 MPa compressive strength compared to the slotted axial liner needing 12 MPa. At 250 m depth, the helical liner bending members nominally require 7.5 MPa compressive strength compared to 40 MPa equivalent for the axially slotted design. At 750 m depth, the helical liner bending members would require 22.5 MPa compressive strength compared to 120 MPa equivalent for the axially slotted liner.

Referring further to Table 2, for 75 m depths, this helical configuration could use the thinnest 5.87 mm thick wall with API H40 steel, while the axially slotted design would need heavier 6.91 mm thick wall with higher strength J55 steel. For 250 m depths, this helical configuration could still use the 5.87 mm H40 wall while the axially slotted design would need to use 57% thicker 9.19 mm wall with API L80 steel with twice the yield strength. For 750 m depths, the helical configuration could modestly increase to an 8.05 mm thick wall with API J55 steel while the higher stress for axially slotted liner cannot be met by commonly available pipe walls or steel.

Table 2 further reflects material costs for axially slotted pipe may be about 50% higher then this helical configuration at 75 m increasing to about 234% for 250 m depths, assuming commonly available pipe configurations. At 750 m depth helical liner material may only cost about 40% more than the 250 m depth design. While these comparisons show substantial benefits, similar benefits are expected for other configurations, with further benefits obtained from commercial production.

Bending strain relief: The axial strain relief provided in the configurations described herein provides strain relief for both expansion and compression, and consequently for bending. FIG. 19 shows bending strain relief for liner 10 with a bending radius RB about an angle B resulting in a bending of the liner axis by angle B. This bending relief shows the inner strain relief slots just closed in compression while expansive strain relief is provided by the outer slots 31 expanding between bending members 44. For example, the configuration S4 in FIG. 6 allows a 1% outer expansion and inner compression within a 60% bending member elastic design stress. This enables bending a 177.8 mm (7") bendable liner to be elastically bent with a 17.8 m (58.3 ft) midline radius RB.

Generalization

From the foregoing description, a person skilled in the art will appreciate that a novel approach for providing strain relief methods and configuring thermal liners and bending tubes has been disclosed using one or more methods described herein. While the components, techniques, and aspects of the invention have been described with a certain degree of particularity, it is manifest that many changes may be made in the specific designs, constructions and methodology herein above described without departing from the spirit and scope of this disclosure.

Where dimensions are given they are generally for illustrative purpose and are not prescriptive. Of course, as the skilled artisan will appreciate, other suitable sizes, angles, and configurations of the bending members, bases, bridges, spacers, outdents, indents, teeth, sockets, patterns, rod outer widths, rod inner widths, compensated widths, outer and inner radius and widths, steps, non-axial slots, filter slots, filter cavities, filter components, and other components may be efficaciously utilized, as needed or desired, giving due consideration to the goals of achieving one or more of axial strain relief, tubular bending, filtration, compressive strength, and/or torsional strength benefits and advantages as taught or suggested herein.

Where bendable thermal liner configurations are provided, similar configurations or combinations of those configurations may be efficaciously utilized, including varying the nominal thicknesses, widths, lengths, cross sectional shapes, spacings, orientations, offsets, overlaps, and other dimensions and parameters of the components used for forming the axial or bending strain relief, filtration, compressive support, and/or torsional strength capabilities of the strain relief liners.

Where assembly methods are described, various alternative assembly methods may be efficaciously utilized to achieve configurations and provide the benefits and advantages of one or more of the embodiments or configurations as taught or suggested herein.

Where transverse, axial, radial, circumferential, azimuthal or other directions are referred to, it will be appreciated that any general coordinate system using curvilinear coordinates may be utilized including Cartesian, cylindrical, spherical, annular or other coordinate system. Similarly, the bending members, bases, bridges, non-axial slots, filter slots, filter cavities and/or other components may be generally rearranged to achieve other beneficial combinations of the features and methods described.

While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but includes the full range of equivalency to which each element is entitled.

What is claimed is:

1. A strain relief filter liner with a longitudinal Z axis having a wound wall portion, having an outer area filter fraction, comprising:
   a non-hydrocarbon rod having alternating bases and bending members, the bending members having a Z transverse profile in a YZ plane comprising the Z axis and a radially outward Y axis,
   helically wound into a first rod winding and a second adjacent rod winding to form shaped non-axial slots in the wound wall portion;
   wherein the Z transverse profile has a radially outer width that is wider than a radially intermediate width and a radially inner width;
   the rod comprising one of:
   multiple Z axially transverse teeth and sockets bonded along a circumferential base length CB on one of a side contact and a step contact, or alternating starboard and port Z axially transverse corrugations;
   to form a plurality of bending members axially separating adjacent shaped non-axial slots, and
   to form a plurality of bases, each base supporting circumferentially connected bending members axially adjacent a shaped non-axial slot;
   a plurality of base connections, each base connection including one of a first joint or a first spacer joining a pair of axially adjacent bases;
   wherein circumferentially neighboring bases connected to a bending member are displaced by a circumferential offset CO that is greater than the circumferential base length CB and less than a circumferential slot length CS; and
   wherein along a longitudinal line in the wall parallel to the Z axis, a liner's axial strain relief capacity, being the sum of radially outward axial widths of shaped non-axial slots, is greater than 0.10% of a total axial non-slot wall length.

2. The liner of claim 1, wherein transverse teeth in the first rod winding fit in transverse sockets in the second adjacent rod winding, wherein the cross sectional area of bonded teeth in a plane perpendicular to the Z axis transecting one tooth to socket bond is between 20% and 50% of the cross sectional area of the wound liner wall taken in that plane.

3. The liner of claim 2, wherein one of the transverse teeth and one of the transverse sockets are bonded together along a side contact at one of a gear angle TG or a socket angle TS to the helical winding direction greater than five degrees from the YZ plane.

4. The liner of claim 2, wherein the separation between a Z axially outer end of one of the transverse teeth and a Z axially inner end of the respective transverse socket forms one shaped non-axial slot.

5. The liner of claim 2, wherein a first step between a tooth and socket on the first rod winding is positioned against a second step between a socket and tooth on the second adjacent rod winding.

6. The liner of claim 1, wherein the first rod winding comprises the first spacer and the second adjacent rod winding comprises a second spacer bonded to the first spacer, wherein the ratio of a first Z width of the first spacer along the axial Z direction to a second Z width of the second adjacent spacer is between 0.5 and 2.0.

7. The liner of claim 1, wherein the first rod winding is bonded to the second adjacent rod winding by the first joint or first spacer positioned radially outwardly, and by a second joint or second spacer positioned radially inwardly.

8. The liner of claim 1, wherein the Z transverse profile has an I-beam shape and the radially outer width is greater than the radially inner width, both of which are greater than the radially intermediate width.

9. The liner of claim h wherein a radially outer portion of the Z transverse profile has an arched shape, having a radially outer width greater than a radially intermediate width; and wherein the radially inner portion of the Z transverse profile has a substantially radial non-arched shape.

10. The liner of claim 1, wherein the outer area filter fraction comprises between 5% and 60% of the outer surface area of the strain relief filter liner.

11. The liner of claim 1, wherein the helically wound rod has an axially port side in tension and a starboard side in compression whereby forming a compressive stress drawing together the first rod winding and the second adjacent rod winding.

12. The liner of claim 9, wherein the shaped non-axial slots have a radially outer hexagonal shape and a radially inner hexagonal shape, wherein an H circumferentially outer length CSO of the radially outer hexagonal shape is shorter than an H circumferentially inner length CSI of the radially inner hexagonal shape, or wherein a length of a side along a helical axis H of the radially outer hexagonal shape is longer than a base length CB of a side along the helical axis H of the radially inner hexagonal shape.

13. The liner of claim 1, wherein the outer widths of the shaped non-axial slots are in the range of 0.1 mm (0.004") to 1.0 mm (0.040").

14. The liner of claim 1, wherein the liner's axial strain relief capacity is greater than 0.5 percent.

15. A method of forming a slotted liner with a wound wall of axial length L comprising a plurality of non-axial strain relief slots not aligned with a longitudinal liner Z axis; the method comprising:
  forming a profiled rod of non-hydrocarbon material with longitudinal H axis and vertical Y axis, by Z transversely profiling a wire or a rod to a YZ profile;
  longitudinally forming the profiled rod:
  into a plurality of Z transversely alternating starboard and port supporting bases, each with a Z mating surface; and
  a plurality of H interspersed bending members;
  by one of:
  bonding Z transverse spacers to the profiled rod;
  Z transversely corrugating the profiled rod; or
  forming the rod with one of Z transverse outdents and indents;
  helically coiling the profiled rod to the outer diameter OD into a coil; and
  bonding together Z mating surfaces between pairs of Z axially adjacent bases,
  wherein the non-axial strain relief slots are formed adjacent the bonded bases and H interspersed bending members; and
  wherein axial strain relief capacity, which is a sum of radially outer slot widths of non-axial strain relief slots, is greater than 0.1% of liner length L, along a line parallel to the Z axis taken through bonded base pairs and adjacent non-axial strain relief slots.

16. The liner method of claim 15, wherein longitudinally forming the profiled rod comprises transversely corrugating the rod alternatingly in Z axial starboard and port directions while forming the rod YZ profile, and mating surfaces, configured to form base pairs adjacent non-axial strain relief slots when wound into the slotted liner.

17. The liner method of claim 16, wherein forming the profiled rod comprises forming the rod radially into an I-beam shape H longitudinally between bases, with a radially intermediate rod width smaller than a radially outer rod width and a radially inner rod width, and wherein helically coiling the profiled rod further comprises filling a filter cavity formed thereby with filter media.

18. The liner method of claim 15, further comprising laser trimming a radially outer Z transverse side of one of the bending members to form a trimmed radially outer slot width of an adjacent non-axial slot greater than an initial radially outer slot width.

19. The liner method of claim 18, wherein further comprising laser trimming a Z side of a radially outer portion of a bending member at a trimming angle to the radial direction of between 0.1 degrees and 45 degrees to a depth between 1% and 50% of a rod radial depth W to form an outwardly widening nonlinearly shaped YZ profile, thereby forming an adjacent outwardly narrowing shaped slot.

20. The liner method of claim 15, wherein forming the profiled rod comprises forming base members with a radially outward expanding tapered profile, to form base member Z bonding surfaces by helical cooling.

21. The liner method of claim 15, wherein forming the profiled rod comprises:
  forming base and bending member profiles with radially outer widths to configure radially outer slot widths of a plurality of non-axial strain relief slots adjacent those base and bending members within a prescribed range selected between 0.15 mm (0.006") and 0.89 mm (0.035").

22. The liner method of claim 15, further comprising straightening the wire or rod while profiling it.

23. The liner method of claim 15, comprising configuring the axial strain relief capacity greater than 0.3% of liner length L, and
  forming a total outer slot area, of the plurality of non-axial strain relief slots, greater than 5% of a gross liner outer surface area.

24. The liner method of claim 15, comprising transversely profiling and longitudinally forming the rod, and forming the plurality of non-axial strain relief slots, to provide axial strain relief capacity greater than 0.3% of liner length L, in both tension and compression.

25. The liner method of claim 15, wherein bonding comprises using non additive laser welding to-bend base pairs together while helically coiling the profiled rod.

26. The liner method of claim 15, wherein longitudinally forming the profiled rod comprises pressing the rod into the alternating Z transversely oriented port and starboard bases and into H interspersed bending members.

27. The liner method of claim 15, wherein longitudinally forming the profiled rod comprises forming a geared configuration of Z axially transverse starboard and port indents and outdents, alternating along the H axis, wherein a space between an outdent end and an indent base of a Z axially neighboring indent forms one non-axial strain relief slot.

28. The liner method of claim 27, wherein forming the geared configuration comprises stamping and coiling the rod, wherein forming mating surfaces between adjacent outdent and indent sides at an acute angle to the Z axial direction.

29. The liner method of claim 27, wherein forming the geared configuration comprises stamping and coiling the profiled rod, wherein non-axial strain relief slots are formed between outdent ends and indent bases having a radially outwardly narrowing width within a radially outer 50% of the non-axial strain relief slots.

30. The liner method of claim 27, wherein forming the geared configuration comprises stamping and coiling the profiled rod, wherein Z mating steps on outdent and indent sides are formed to control radially outer slot widths of non-axial strain relief slots.

31. The liner method of claim 27, wherein forming the profiled rod comprises forming outdent ends and indent bases with a radially intermediate profile narrower than a radially outer profile and a radially inner profile, and further comprising filling with filter media a filter cavity formed thereby.

32. The liner method of claim 15, wherein the profile rod is formed with a first starboard outdent with a first Z axial width along the starboard Z axial direction on a first rod coil, and a second port Z outdent with a second Z axial width along the port Z axial direction on a second rod coil, wherein the ratio of the first Z axial width to the second Z axial width is between 0.5 and 2.0; and further comprising bonding together the first starboard outdent to the second port outdent.

33. The liner of claim 8, wherein a filter cavity formed between the I-beam shape of the first rod winding and the second rod winding comprises filter material.

* * * * *